United States Patent
Huang et al.

(10) Patent No.: US 10,846,425 B2
(45) Date of Patent: *Nov. 24, 2020

(54) DATA PROTECTION BASED ON USER INPUT DURING DEVICE BOOT-UP, USER LOGIN, AND DEVICE SHUT-DOWN STATES

(71) Applicant: Microsoft Technology Licensing, LLC, Redmond, WA (US)

(72) Inventors: Jerry Huang, Redmond, WA (US); Zhen Liu, Tarrytown, NY (US); QingHu Li, Beijing (CN); Chen Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/423,746

(22) Filed: May 28, 2019

(65) Prior Publication Data

US 2019/0278940 A1 Sep. 12, 2019

Related U.S. Application Data

(63) Continuation of application No. 14/402,982, filed on Nov. 21, 2014, now Pat. No. 10,372,937.

(51) Int. Cl.
*G06F 21/62* (2013.01)
*G06F 21/31* (2013.01)
(Continued)

(52) U.S. Cl.
CPC ........ *G06F 21/6245* (2013.01); *G06F 21/316* (2013.01); *G06F 21/575* (2013.01);
(Continued)

(58) Field of Classification Search
CPC .. G06F 21/6245; G06F 21/316; G06F 21/575; G06F 21/83; G06F 21/88
See application file for complete search history.

(56) References Cited

U.S. PATENT DOCUMENTS 6,446,085 B1 * 9/2002 Gusler .................... G06F 16/10
6,567,928 B1 * 5/2003 Lyle ..................... G06F 11/1471
707/999.202

(Continued)

FOREIGN PATENT DOCUMENTS

JP 2013214219 A 10/2013
KR 20090108591 A 10/2009

OTHER PUBLICATIONS

"Notice of Allowance Issued in U.S. Appl. No. 14/400,529", dated Jun. 18, 2019, 15 Pages.

(Continued)

*Primary Examiner* — Ali S Abyaneh
*Assistant Examiner* — Shu Chun Gao
(74) *Attorney, Agent, or Firm* — Fiala & Weaver P.L.L.C.

(57) ABSTRACT

A computing device is described herein that automatically enters a data protection mode in response to the detected presence or absence of certain user input and/or user input behaviors during a device boot-up state, a user login state, or a device shut-down state. When the device enters the data protection mode, sensitive data stored on the device is automatically rendered invisible and/or inaccessible to a user thereof. The sensitive data may be rendered invisible and/or inaccessible in a manner that is not likely to be apparent to the user of the computing device.

20 Claims, 9 Drawing Sheets

(51) Int. Cl.
*G06F 21/88* (2013.01)
*G06F 21/57* (2013.01)
*G06F 21/83* (2013.01)

(52) U.S. Cl.
CPC .............. *G06F 21/83* (2013.01); *G06F 21/88* (2013.01); *G06F 2221/034* (2013.01); *G06F 2221/2111* (2013.01); *G06F 2221/2137* (2013.01); *G06F 2221/2139* (2013.01)

(56) References Cited

U.S. PATENT DOCUMENTS

| | | | |
|---|---|---|---|
| 6,609,198 | B1 | 8/2003 | Wood et al. |
| 7,774,315 | B1 * | 8/2010 | Galker ................ G06F 11/1464 707/644 |
| 2003/0051059 | A1 | 3/2003 | Zondervan et al. |
| 2005/0166065 | A1 | 7/2005 | Eytchison et al. |
| 2006/0174339 | A1 | 8/2006 | Tao |
| 2006/0206524 | A1 * | 9/2006 | MacLaurin ........... G06F 16/258 |
| 2006/0224898 | A1 | 10/2006 | Ahmed |
| 2007/0250920 | A1 * | 10/2007 | Lindsay ................ G07F 7/1025 726/7 |
| 2008/0022133 | A1 * | 1/2008 | Sobel ................. G06F 21/6218 713/193 |
| 2009/0083850 | A1 | 3/2009 | Fadell et al. |
| 2009/0259588 | A1 * | 10/2009 | Lindsay ............... G06Q 20/102 705/40 |
| 2010/0269165 | A1 | 10/2010 | Chen et al. |
| 2011/0023115 | A1 * | 1/2011 | Wright .................. G06F 21/552 726/22 |
| 2012/0047574 | A1 | 2/2012 | Kim et al. |
| 2012/0246737 | A1 | 9/2012 | Paxton et al. |
| 2013/0276125 | A1 | 10/2013 | Bailey |
| 2014/0032833 | A1 * | 1/2014 | Cudak .................. G06F 3/0608 711/112 |
| 2014/0173286 | A1 | 6/2014 | Novak |

OTHER PUBLICATIONS

"Third Office Action Issued in Chinese Patent Application No. 201480048056.2", dated Jul. 16, 2019, 7 Pages.
"Office Action Issued in European Patent Application No. 14895916.6", dated Aug. 12, 2019, 5 Pages.
"Office Action Issued in Chinese Patent Application No. 201480047932.X", dated Apr. 28, 2019, 9 Pages.
"Office Action Issued in Korean Patent Application No. 10-2017-7000157", date Sep. 10, 2020, 17 pages.
"Office Action Issued in Indian Patent Application No. 20164704396", dated Sep. 22, 2020, 7 pages.
"Office Action Issued in Korean Patent Application No. 10-2016-7036286", dated Sep. 6, 2020, 18 pages.

* cited by examiner

DATA PROTECTION BASED ON USER INPUT DURING DEVICE BOOT-UP, USER LOGIN, AND DEVICE SHUT-DOWN STATES

CROSS-REFERENCE TO RELATED APPLICATIONS

This application is a continuation of U.S. patent application Ser. No. 14/402,982, filed Nov. 21, 2014, which is a U.S. national phase of International Application No. PCT/CN2014/080943 filed Jun. 27, 2014, which designated the U.S. and is incorporated by reference herein in its entirety.

BACKGROUND

Increasingly more data is being stored on devices, particularly mobile devices. For instance, people may store personal data, and employees may store corporate data, governmental data, client-related data, intellectual property, and/or other sensitive forms of data on their devices. This sensitive data is put at risk when a device is lost, stolen, or compromised in some other manner.

To address this issue, techniques have been developed to protect sensitive data on devices. Conventional device data protection techniques typically rely on some form of user authentication, encryption, or a combination thereof. For example, a user may set up her device to require a particular password or PIN to be entered before data may be accessed on the device. Additionally, some devices enable users to encrypt files or folders stored thereon, which means that a code must be entered before a file can be viewed or copied. While such mechanisms can help protect sensitive data from unauthorized access, they are not foolproof. For example, a password mechanism will not work if the user is forced to give out her password against her will, or if the device is taken away while in active operation (i.e., after the user has already entered her password). Still other means may be used to overcome user authentication and encryption schemes. Once these data protection measures have been overcome, there is typically no way to protect the sensitive data from unauthorized access.

If a user determines that she is in a place where her device is likely to be stolen, she may be able to take active steps to protect the sensitive data. For example, the user may be able to input commands to the device to delete all the sensitive data therefrom. Depending upon the scenario, this may be necessary to protect the user's personal safety as well as the sensitive data. However, in many situations, the user will not be able to anticipate that her device will be stolen and thus will not take such steps. Even in situations where the user can anticipate a device theft, the user may not have sufficient time at her disposal to interact with her device to delete the sensitive data therefrom.

SUMMARY

A computing device is described herein that automatically enters a data protection mode in response to the detected presence or absence of certain user input and/or user input behaviors during a device boot-up state, a user login state, or a device shut-down state. When the device enters the data protection mode, sensitive data stored on the device is automatically rendered invisible and/or inaccessible to a user thereof. The sensitive data may be rendered invisible and/or inaccessible in a manner that is not likely to be apparent to the user of the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
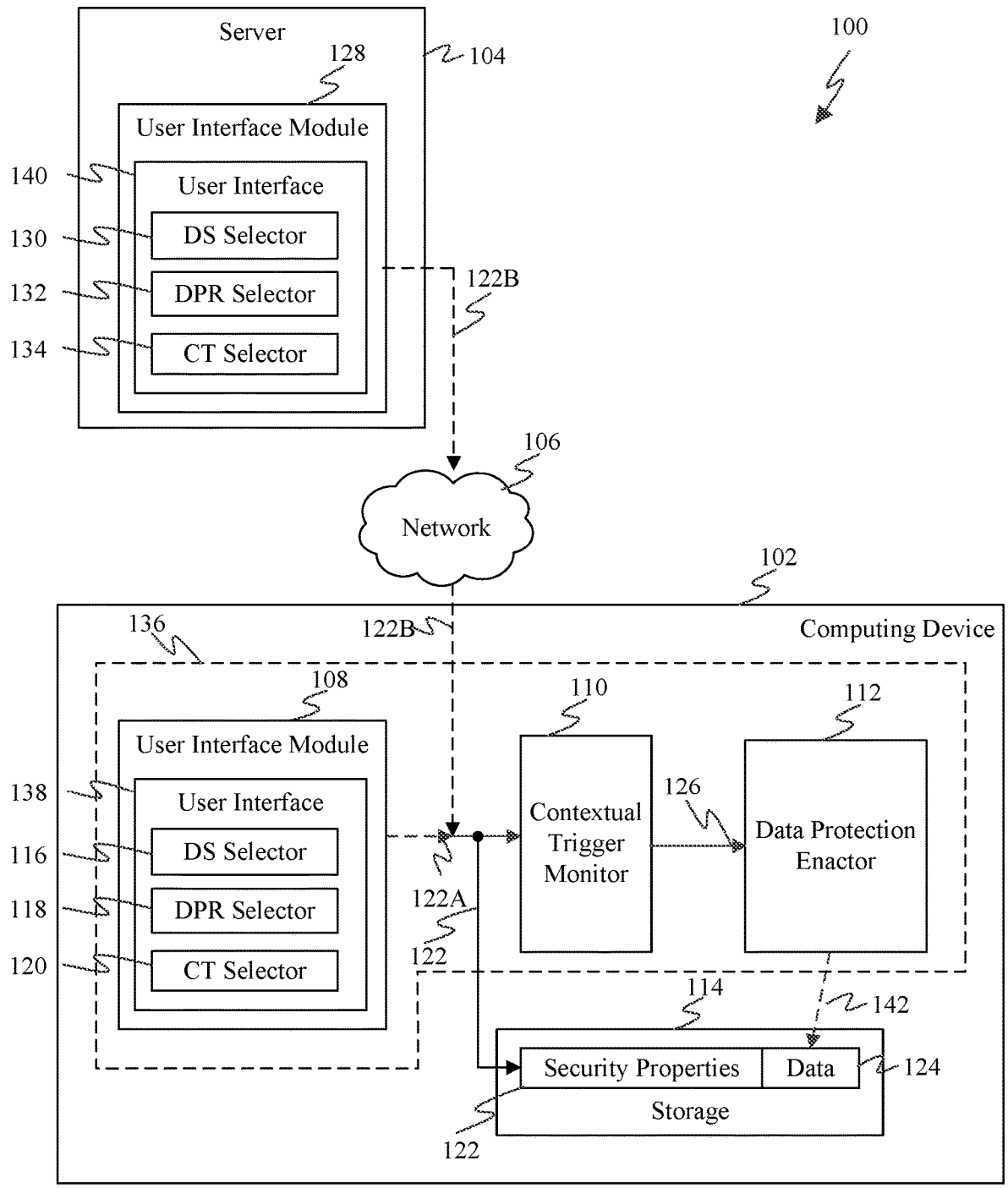
FIG. 1 is a block diagram of a data protection environment that includes a data protection system configured to protect data stored on a computing device, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

A computing device is described herein that automatically enters a data protection mode in response to the detected presence or absence of certain user input and/or user input behaviors during a device boot-up state, a user login state, or a device shut-down state. When the device enters the data protection mode, sensitive data stored on the device is automatically rendered invisible and/or inaccessible to a user thereof. The sensitive data may be rendered invisible and/or inaccessible in a manner that is not apparent to the user of the computing device.

The foregoing features enable the computing device to automatically, quickly and discretely hide or delete sensitive data that is stored by the computing device when an unauthorized or malicious user takes possession of the computing device. Since the unauthorized or malicious user will likely not be aware of the user input and/or user input behaviors that must be present during device boot-up, user login, or device shut-down to avoid triggering the data protection mode, such mode will be activated thereby causing sensitive data to be automatically hidden or deleted. Furthermore, since embodiments will still present non-sensitive data to the user and otherwise function normally, the unauthorized or malicious user may not be aware that data protection has been activated. By automatically, quickly and discretely hiding or deleting sensitive data in this manner, embodiments described herein can effectively protect sensitive data stored on the computing device as well as the personal safety of the user or owner of the device.

Section II below describes exemplary data protection environments that include a computing device that implements contextually triggered data protection. Section III describes an exemplary embodiment where the detected presence or absence of certain user input and/or user input behaviors during a user login state is used as a contextual trigger for data protection. Section IV describes an exemplary embodiment where the detected presence or absence of certain user input and/or user input behaviors during a device boot-up state is used as a contextual trigger for data protection. Section V describes an exemplary embodiment where the detected presence or absence of certain user input and/or user input behaviors during a device shut-down state is used as a contextual trigger for data protection. Section VI describes example mobile and desktop device implementations of the computing device. Section VII provides some further example embodiments. Section VIII provides some concluding remarks.

II. Example Embodiments for Contextually Triggered Data Protection

Embodiments described herein enable protection of data stored on devices in a configurable and automatic manner based on context. Context-based data protection enables a user to set up policies to protect data on devices against undesired access, such as in situations where a device has been stolen, where the device is being used against the user's will (e.g., the user has been forced to give out the device password, the device has been taken away while in active operation, etc.), and in other situations. Predefined actions are automatically executed to protect the data when a risky external context is detected so as to prevent the data from being compromised.

Context-based data protection systems guard against access that is unintentionally or unwillingly authorized by users. Data is automatically protected from being compromised when a risky context is identified.

Embodiments for context-based data protection enforcement and execution architectures are provided. An enforcement architecture may be used to define data sensitivity levels (e.g., Level 1, Level 2, etc.), data protection responses (e.g., soft delete, hard delete, etc.), risk/trigger contexts (Context 1, Context 2), and a mapping between these elements (e.g., Level 1→Context 1→soft delete, which indicates that Level 1 content is to be soft deleted when Context 1 is detected). An execution architecture is configured to activate the predefined action/response to ensure the data is protected. Actions such as a "soft delete" can be recovered from, while a "hard delete" erases data completely without an option for recovery of the data. Data can also be hidden by causing it not to be retrieved in response to file system requests.

In embodiments, potential risky situations can arise in any device state, and techniques for the user to inform the system discretely or for the system to detect the situation automatically are provided. A context-based data protection architecture can be implemented and enforced with any one of or combination of the following control points:

Device in the powered off state: Enforcement can be accomplished by including an additional chipset (e.g., an additional processor, operating system, etc.) in the device to implement tamper detection.

Device in the boot-up state: The device can automatically boot into a data protection mode when a predefined key interrupt (e.g., a particular key combination, etc.) or other predetermined user input is not provided by the user.

Device in the user login state: An alternate password than the general device login password may need to be entered for a user account that is tied to data protection. The presence or absence of additional input and/or input behaviors during the user login process may also be detected and used to determine whether or not to activate data protection.

Device in the operation state:
  A physical location of the device can indicate possible threats.
  A camera of the device can detect a number of people facing the device within a particular distance to identify a risky environment.
  A device can be stolen or taken when it is in operation and not protected, and whether a user of the device is legitimate may be determined based on a user interface (UI) input pattern (e.g., a keyboard/finger touch area, size/mouse usage pattern, etc.).
  A device may be configured to detect a biometric signal of a user to determine a risk (e.g., login user is under duress and therefore data protection may be enacted discretely).

Device in the shut-down state: The device may be forced to shut down without the user's permission. In this case, when a shutdown password or other predetermined user input is not provided, a risk to data stored by the device may be identified.

In an example embodiment, data protection is configured for selected data on a device as follows. In an illustrative example used in the following several paragraphs, biometric information from a user of the device is configured as the contextual trigger for activating the data protection:

(A) The content to be protected, the context trigger, and the protection response are defined. For instance, the file(s) and/or the folder(s) defining the content to be protected are specified. The contextual trigger and the associated data protection policy are set for the content. Numerous different types of context triggers may selected, including those based on biometric information. For example, data protection context can be tied to a physical condition of the user (e.g., a user's heart rate, sweat level, facial expression, etc.). Unusual/abnormal operating values for the physical condition can be defined, as well as the associated action/response to take. (e.g., if heart rate>100 bpm→delete sensitive content.)

(B) The context of access to the content is monitored and recognized. There are many ways to detect the context depending on the particular context configuration. For example, with respect to biometric information, the device may detect an abnormal physical condition of the user and trigger the predefined action/response. Sensors (onboard and/or remote to the device) can monitor various physical conditions of the user, such as a distance of the user from the device, heart rate, sweat level, temperature, blood pressure, etc.

(C) Various possible responses can be taken to protect the data in the event that the contextual trigger is detected. Examples of such data protection responses include one or more of: a hard delete, where data marked as sensitive is automatically deleted from the device without any option for recovery; a soft delete, such as where data marked as sensitive is protected by deleting links or file pointers to the data and storing the links or file pointers in a safe location without immediately overwriting the data; hiding the data by causing file system data requests that target sensitive data to be ignored; providing an alert to the user (e.g., a message, a sound, a visual alert, etc.); disabling a file from being opened; closing an opened window in which data is displayed or hiding such a window behind other windows, etc.

(D) If the data is soft deleted as a data protection response, the data may later be recovered by the operating system. Soft deletion may comprise, for example, deleting only links or file pointers to the data (e.g., files). In such an embodiment, the data can be recovered/restored by restoring the links or file pointers from a secure store. In one embodiment, the restoration of the data can be automatic, such as the next time that the user logs in with the correct password and correct password entering context. Alternatively, the restoration may be triggered by a correct password context.

In another embodiment, data protection is configured for selected data on a device as follows. In this embodiment, a location of the device is configured as the contextual trigger for activating the data protection:

(A) The content to be protected, the context trigger, and the protection response are defined. For instance, the file(s)/folder(s) defining the content to be protected are specified. The contextual trigger and the associated data protection policy are set for the content. A geographic location is set as the data protection context, such as by using geo-coordinates, a map, etc. For example, sensitive data may be configured to be (hard or soft) deleted or hidden when the device is in a specific country. A mapping between a data sensitivity level of the content, the context, and the data protection response is configured.

(B) A location of the device is determined. For instance, a current location of the device can be determined using one or more of GPS (global positioning system), a cellular network (e.g., if the device has a SIM card), an IP (Internet protocol) address of an HTTP proxy, etc. Alternatively, a future location of the device can be predicted based on a traveling path of the device (e.g., determined by tracking the location of the device over time). The future location of the device can also be determined by analyzing a calendar of the user on the device, if available (e.g., a location of an appointment), and/or can be determined in other ways.

(C) Various possible data protection responses can be enacted to protect the data in the event that the device is determined to be at the pre-determined location, or predicted to soon be at the pre-determined location. Examples of such data protection responses include those described elsewhere herein or otherwise known, such as an alert, hard delete, soft delete, hiding of data, etc.

(D) If the data is soft deleted as a data protection response, the data may later be recovered by the operating system. Such recovery of the data may be performed as described elsewhere herein or otherwise known.

Further description of data protection embodiments is provided in the following subsections. For instance, the immediately following subsection describes further embodiments for the configuring of protections on data, followed by a subsection that describes further embodiments for the triggering and enactment of data protection.

A. Example Embodiments for Configuring Data Protection

Data protection systems may be configured in various ways to protect data from undesired access, in embodiments. For instance, FIG. 1 is a block diagram of a data protection environment 100 that includes a data protection system 136 configured to protect data stored on a computing device 102, according to an example embodiment. As shown in FIG. 1, data protection environment 100 includes computing device 102 and a server 104. Computing device 102 and server 104 are communicatively coupled by a network 106. Data protection system 136 is included in computing device 102. In the embodiment of FIG. 1, data protection system 136 includes a user interface module 108, a contextual trigger monitor 110, a data protection enactor 112, and storage 114. Furthermore, server 104 includes a user interface module 128. The features of environment 100 are described as follows.

As shown in FIG. 1, data protection system 136 may be implemented in computing device 102. Note that in another embodiment, data protection system 136 may be implemented partially in computing device 102 and partially in server 104. For instance, user interface module 108, contextual trigger monitor 110, and data protection enactor 112 may be included in computing device 102. Alternatively, user interface module 108 may not be present in computing device 102, but instead, user interface module 128 of server 104 may be part of data protection system 136 along with contextual trigger monitor 110 and data protection enactor 112. In another embodiment, both of user interface modules 108 and 128 may be present and part of data protection system 136.

Computing device 102 may be any type of stationary or mobile computing device, including a mobile computer (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™, etc.), a digital camera, or other type of mobile device, or a stationary computing device such as a desktop computer or PC (personal computer).

Storage 114 may include one or more of any type of storage medium/device that is suitable for storing data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium/device.

Data 124 shown stored in storage 114 may be any type of data, including one or more files, one or more folders, a combination of files and folders, and/or any other type of data structure and/or number of data structures. Although a single instance of data (data 124) is shown stored in storage 114, the single instance of data is shown in FIG. 1 for ease of illustration. It is to be understood that any number of instances of data may be stored in storage 114, with each instance being one or more files and/or folders of any size having corresponding security parameters configured as disclosed herein.

Examples of network 106 include a local area network (LAN), a wide area network (WAN), a personal area network (PAN), and/or a combination of communication networks, such as the Internet. For communications over network 106, computing device 102 and server 104 may each include a network interface (e.g., a network interface card (NIC), etc.), a wired or wireless interface, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, etc.

A user may interact with user interface module 108 (when present) at computing device 102, or may interact with user interface module 128 (when present) at server 104, to configure data protection for data stored by computing device 102, such as data 124 stored in storage 114. The user that configures the data protection may be an owner or other user of computing device 102, a system administrator (e.g., when computing device 102 is a device of an enterprise), or other person.

User interface module 108 at computing device 102 may be present as a convenient way for a user of computing device 102 to configure protection for data stored in computing device 102. User interface module 108 may be part of a data protection application stored on computing device 102 (e.g., a standalone desktop or mobile application, an "app" that is partially cloud-based, etc.), may be part of an operating system of computing device 102, or may be present and configured in computing device 102 in another manner.

When interacting with a user interface generated by user interface module 108, a user may be enabled to view data stored in storage 114, such as data 124, and select such data for data protection configuration. The user may interact with the user interface to configure data protection for data 124, and to cause the data protection configuration to be stored in association with data 124 as security properties 122.

In another embodiment, it may be desired to not have user interface module 108 in computing device 102. For instance, it may be determined to be a security weakness if any person who obtains and is able to log into computing device 102 has access to user interface 108, and therefore can configure (including remove) protections for data stored at computing device 102. In such an embodiment, user interface module 108 may not be present at computing device 102, and instead, user interface module 128 may be present at server 104 to be used to configure protection for data stored in computing device 102. For example, user interface module 128 may be part of a data protection application (or an operating system) installed on server 102 that is not network accessible, may be part of a network accessible application (e.g., a browser accessible application), or may be present and configured in server 104 in another manner.

When interacting with a user interface generated by user interface module 128 of server 104, a user may be enabled to view data stored by computing device 102 through network 106, such as data 124, and to select such data for data protection configuration. The user may interact with the user interface to configure data protection for data 124, and may cause the data protection configuration to be stored in association with data 124 as security properties 122.

Figure 2:
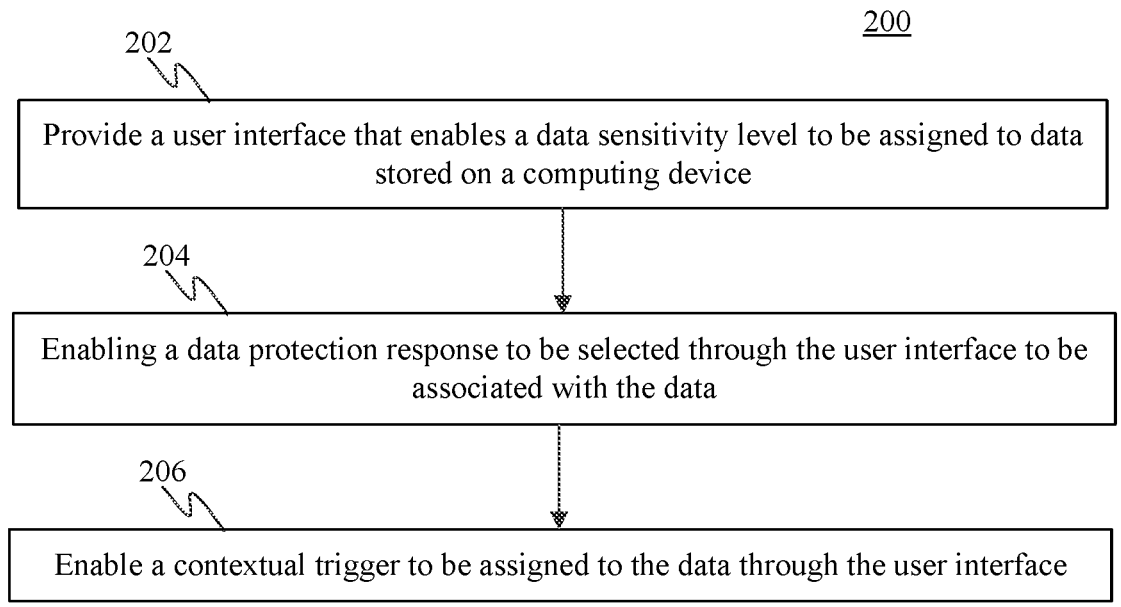
FIG. 2 depicts a flowchart of a process for configuring protection for stored data, according to an example embodiment.

User interface module 108 and/or user interface module 128 may be used to configure data protection in any manner, in embodiments. For instance, in an embodiment, user interface module 108 and/or user interface module 128 may operate in a manner illustrated in FIG. 2. FIG. 2 depicts a flowchart 200 of a process for configuring protection for stored data, according to an example embodiment. Flowchart 200 is described as follows with respect to FIG. 1. Further structural and operational embodiments will be apparent to persons skilled in the relevant art(s) based on the following description.

Flowchart 200 begins with step 202. In step 202, a user interface is provided that enables a data sensitivity level to be assigned to data stored on a computing device. For example, as shown in FIG. 1, user interface module 108 (when present) may generate a user interface 138, and user interface module 128 (when present) may generate a user interface 140. User interface 138 and user interface 140 may each be any type of user interface that includes any number of user interface elements, including a graphical user interface, a touch interface, a voice control interface, a haptic interface, a gesture interface, etc.

In an embodiment, user interface 138 and/or user interface 140 may be provided to enable a data sensitivity level to be assigned to data stored on computing device 102, such as data 124. As shown in FIG. 1, user interface 138 includes a first data sensitivity (DS) selector 116, and user interface 140 includes a second DS selector 130. DS selector 116 and/or DS selector 130, depending on which is present, may be interacted with by a user to assign a data sensitivity level to data 124. For instance, DS selector 116 and/or DS selector 130 may be a user interface element such as a checkbox, a toggle switch, a button, a pull down menu, or another user interface element. The user may interact with the user interface element to select a data sensitivity for data 124. For example, a user may interact with DS selector 116 or DS selector 130 to designate selected data as either sensitive or non-sensitive. In an embodiment, a user may also interact with DS selector 116 or DS selector 130 to designate selected data as having differing degrees of sensitivity (e.g., not sensitive, moderately sensitive, highly sensitive, etc.).

In step 204, a data protection response is enabled to be selected through the user interface to be associated with the data. In an embodiment, user interface 138 and/or user interface 140 may be provided to enable a data protection response to be assigned to data stored on computing device 102, such as data 124. The data protection response is to be enacted with regard to the data in the event that the data is determined to at least potentially be threatened with undesired or risky access (e.g., computing device 102 is misplaced, is potentially stolen, is known to have been stolen, is potentially being accessed by an unauthorized person, a user of computing device 102 is being forced to access the data, etc.).

As shown in FIG. 1, user interface 138 includes a first data protection response (DPR) selector 118, and user interface 140 includes a second DPR selector 132. DPR selector 118 and/or DPR selector 132, depending on which is present, may be interacted with by a user to assign a data protection response to data 124. For instance, DPR selector 118 and/or DPR selector 132 may be any type of user interface element disclosed herein or otherwise known. The user may interact with the user interface element to select a data protection response for data 124. Various types of data protection responses may be available for selection and assignment to data 124.

Figure 3:
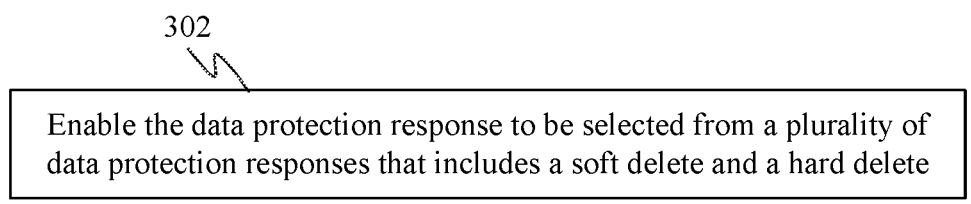
FIG. 3 depicts a flowchart of a process for selecting a data protection response for data, according to an example embodiment.

For instance, in an embodiment, step 204 of flowchart 200 may comprise a process shown in FIG. 3. FIG. 3 depicts a step 302 for selecting a data protection response for data, according to an example embodiment. In step 302, the data protection response is enabled to be selected from a plurality of data protection responses that includes a soft delete and a hard delete. Thus, in an embodiment, DPR selector 118 and/or DPR selector 132 may provide a list of data protection responses, and one or more of the data protection responses may be selected from the list and assigned to the data (e.g., by a pull down menu, checkboxes, etc.). The data protection response may comprise hard deleting the data or soft deleting the data. As will be discussed in more detail herein, a "hard delete" comprises rendering data permanently inaccessible (e.g., overwriting the data in memory/storage), while a "soft delete" comprises rendering the data temporarily inaccessible (e.g., by deleting links or file pointers to the data) such that it may be recovered at a subsequent time. Another example data protection response may comprise hiding the data by causing file system requests for the data to be ignored.

Figure 4:
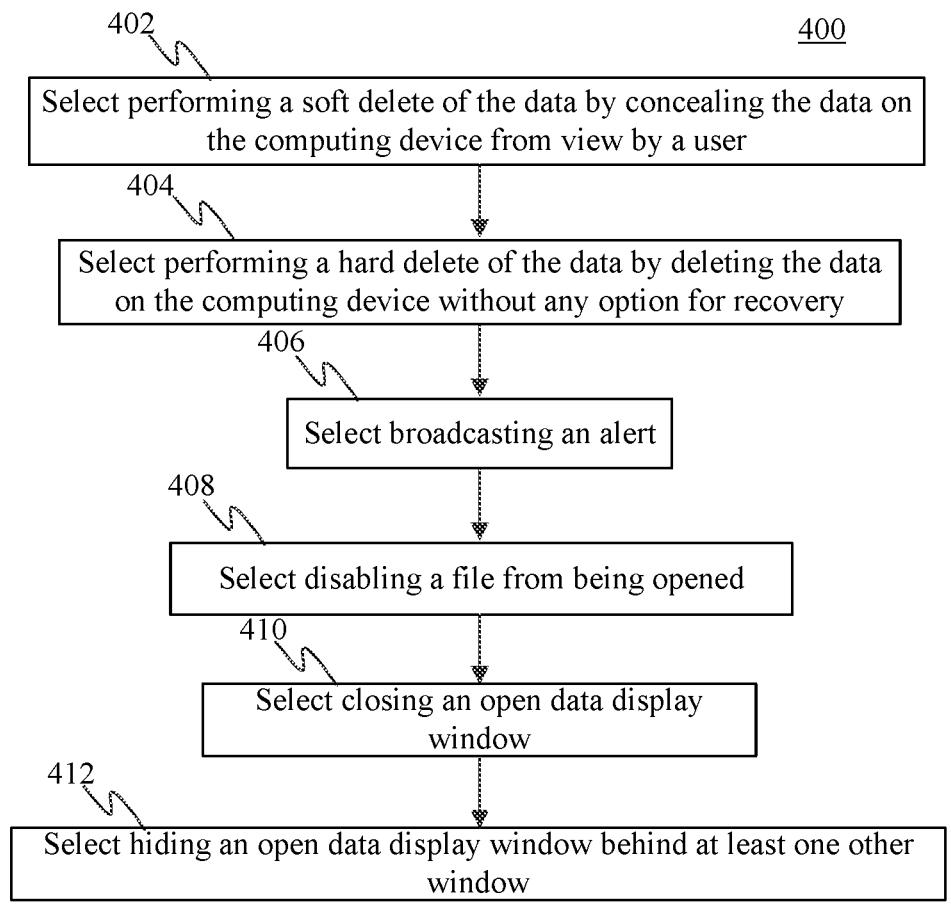
FIG. 4 depicts a flowchart of a process for selecting one or more different data protection responses, according to an example embodiment.

Further types of data protection responses may be selected from. For instance, FIG. 4 depicts a flowchart 400 of a process for selecting one or more different data protection responses, according to an example embodiment. Each step of flowchart 400 describes the selection of a separate and independent data protection response. Any one or more of the data protection responses described in flowchart 400 may be selected and assigned to a particular instance of data. Flowchart 400 is described as follows. Further structural and operational embodiments will be apparent to persons skilled in the relevant art(s) based on the following description.

Flowchart 400 begins with step 402. In step 402, a soft delete data protection response is selected. As described above, DPR selector 118 and/or DPR selector 132 may provide an option for a soft delete to be assigned as a data protection response for data. According to a soft delete, the data is concealed on computing device 102 from view by a user. For instance, links or file pointers to a file that represents the data may be deleted, and the links or file pointers may be stored in a location considered safe for possible later recovery/restoration.

In step 404, a hard delete data protection response is selected. As described above, DPR selector 118 and/or DPR selector 132 may provide an option for a hard delete to be assigned as a data protection response for data. According to a hard delete, the data is deleted from storage (e.g., storage 114) in a manner that the data cannot be recovered or restored. For instance, the storage location where the data was stored may be overwritten.

In step 406, an alert data protection response is selected. In an embodiment, DPR selector 118 and/or DPR selector 132 may provide an option for an alert to be assigned as a data protection response for data. An alert may be configured to notify an authorized user of computing device 102 (e.g., the owner, a system administrator, etc.) that the data may be threatened with unauthorized access. The alert may be delivered/transmitted to an address of phone number of the authorized user, or presented in another form, including as an email message, a text message, a social network message, a phone call, a beeping noise (or other sound), etc.

In step 408, a data protection response is selected that disables a file from being opened. In an embodiment, DPR selector 118 and/or DPR selector 132 may provide an option for disabling one or more files (representing data) from being opened as a data protection response for the data. The file(s) may be disabled from being opened in any manner, including by locking the file(s), increasing permissions on the file(s) (above the access rights of the user), etc.

In step 410, a data protection response is selected that causes an open data display window to be closed. In an embodiment, DPR selector 118 and/or DPR selector 132 may provide an option for closing an open display window that displays data as a data protection response for the data.

In step 412, a data protection response is selected that causes an open data display window to be hidden behind at least one other window. In an embodiment, DPR selector 118 and/or DPR selector 132 may provide an option for hiding an open display window behind one or more other windows as a data protection response for the data. For instance, the data display window may be moved behind one or more other windows that are already open, and/or one or more new windows may be opened in front of the data display window.

Note that, as described herein, DPR selector 118 and/or DPR selector 132 may be interacted with to assign a data protection response to data. In another embodiment, a data protection response may be pre-associated with a data sensitivity, and when the data sensitivity level is assigned to particular data, the associated data protection response is also assigned to the data. For instance, a soft delete may be associated with a low data sensitivity level, and a hard delete may be associated with a high data sensitivity level. If a low sensitivity level is assigned to particular data (in step 202 of flowchart 200), the soft delete is also automatically assigned to the particular data (in step 204).

Referring back to FIG. 2, in step 206, a contextual trigger is enabled to be assigned to the data through the user interface. In an embodiment, user interface 138 and/or user interface 140 may be provided to enable a contextual trigger to be assigned to data stored on computing device 102, such as data 124. The contextual trigger may be a condition or set of conditions that, when detected, indicate that computing device 102 has become subject or susceptible to an unauthorized access.

As shown in FIG. 1, user interface 138 includes a first contextual trigger (CT) selector 120, and user interface 140 includes a second CT selector 134. CT selector 120 and/or CT selector 134, depending on which is present, may be interacted with by a user to set a contextual trigger, the detection of which causes a data protection mode to be activated by data protection enactor 112. For instance, CT selector 120 and/or CT selector 134 may be any type of user interface element disclosed herein or otherwise known. The user may interact with the user interface element to select a contextual trigger for data 124. Examples of contextual triggers include but are not limited to: sensing that unauthorized users are in close proximity to computing device 102; tampering with computing device 102; the detected presence or absence of certain user input and/or user input behaviors during device boot-up, login, or shut down; and sensed behaviors of a user of computing device 102 indicating that the user is not an authorized user. A wide variety of other contextual triggers may be used as well.

As described above, the sensitivity level, data protection response, and contextual trigger may be selected for assignment to data 124. Selections of sensitivity level, data protection response, and contextual trigger made at computing device 102 are output from user interface module 108 as security properties 122A. Selections of sensitivity level, data protection response, and contextual trigger made at server 104 are output from user interface module 128 as security properties 122B, and are transmitted in a communication signal over network 106 to computing device 102. Security properties 122A or 122B may be stored in association with data 124 as security properties 122.

B. Example Embodiments for Triggering and Enacting Data Protection

Figure 5:
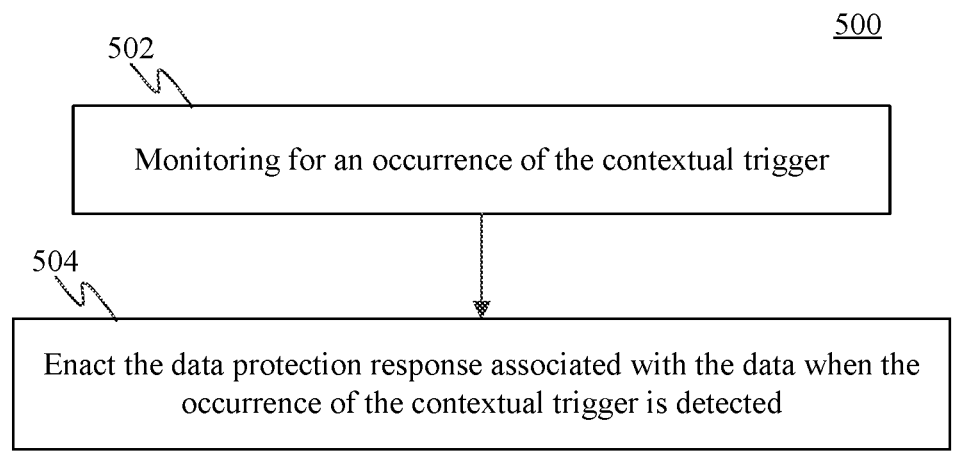
FIG. 5 depicts a flowchart of a process for monitoring a contextual trigger associated with data to trigger enactment of a data protection response, according to an example embodiment.

Data protection systems may be configured in various ways to monitor for data threatened with unauthorized access, and to enact data protection policies to protect the data. For instance, as described above with respect to FIG. 1, data protection system 136 in computing device 102 includes contextual trigger monitor 110 and data protection enactor 112. Contextual trigger monitor 110 and data protection enactor 112 are respectively configured to detect unauthorized access of data, and to enact data protection. Contextual trigger monitor 110 and data protection enactor 112 are described as follows with respect to FIG. 5. FIG. 5 depicts a flowchart 500 providing a process for monitoring a contextual trigger associated with data to trigger enactment of a data protection response, according to an example embodiment. Flowchart 500, contextual trigger monitor 110 and data protection enactor 112 are described as follows. Further structural and operational embodiments will be apparent to persons skilled in the relevant art(s) based on the following description.

Flowchart 500 begins with step 502. In step 502, an occurrence of the contextual trigger is monitored for. For example, as shown in FIG. 1, contextual trigger monitor 110 receives the contextual trigger(s) of security properties 122 associated with data 124. Contextual trigger monitor 110 may receive the contextual trigger(s) of security properties 122 directly from user interface module 108 and/or user interface module 128, or from storage 114. Contextual trigger monitor 110 operates over time to determine if any of the contextual trigger(s) have been detected. If contextual trigger monitor 110 determines that a contextual trigger has been detected, then contextual trigger monitor 110 notifies data protection enactor 112 by generating a trigger notification 126.

In step 504, the data protection response associated with the data is enacted when the occurrence of the contextual trigger is detected. In response to trigger notification 126, data protection enactor 112 may enact the data protection response(s) in security properties 122 associated with data 124. The enacted data protection response is illustrated as enacted action 142 in FIG. 1.

In embodiments, the data protection response in security properties 122 may indicate, and data protection enactor 112 may enact, any one or more data protection responses mentioned herein or otherwise known. For example, the data protection response may indicate and data protection enactor 112 may enact any one or more of the data protection responses described above in reference to flowchart 400 (FIG. 4) and described elsewhere herein, and/or any other suitable data protection responses that would be apparent to persons skilled in the relevant art(s) based on the teachings herein. Accordingly, data protection enactor 112 may include or access functionality for performing one or more data protection responses. For instance, data protection enactor 112 may include or access a file manager module capable of performing soft deletes of files and/or folders (which may include file encryption, file/folder moving and/or renaming, reconfiguring links to files/folders, etc.). Data protection enactor 112 may include or access a messaging module configured to send alert messages (e.g., a texting tool, an email tool, an instant messaging tool, a social network messaging tool, a phone communication tool, an audio tool, etc.). In another example, data protection enactor 112 may include or access a window management module (e.g., of an OS) capable of rearranging displayed windows and/or opening windows. Data protection enactor 112 may

Figure 6:
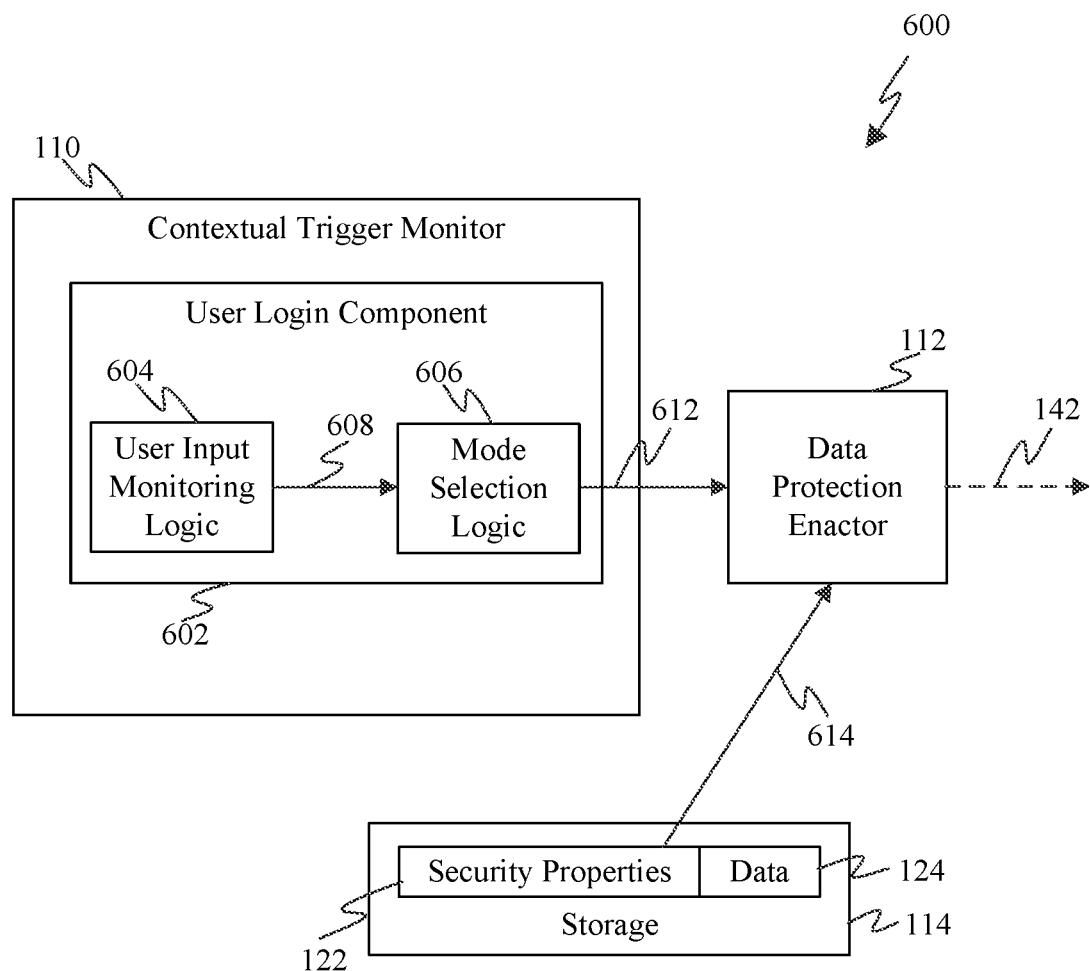
FIG. 6 is a block diagram of a data protection system configured to use the detected presence or absence of certain user input and/or user input behaviors during a user login state of a computing device as a contextual trigger for data protection, according to an example embodiment.

III. Example Contextual Triggers Based on Detected Presence or Absence of Certain User Input and/or User Input Behaviors During User Login State Contextual trigger monitor 110 may be configured in various ways to monitor for triggers indicating that data is exposed to or threatened with unauthorized access. For instance, FIG. 6 is a block diagram of a portion of a data protection system 600 that is configured to use as a contextual trigger the detected presence or absence of certain user input and/or user input behaviors during a user login state of a computing device, according to an example embodiment. As shown in FIG. 6, data protection system 600 includes contextual trigger monitor 110 and data protection enactor 112. Furthermore, contextual trigger monitor 110 includes a user login component 602 that comprises user input monitoring logic 604 and mode selection logic 606. In an embodiment, contextual trigger monitor 110 may perform step 502 of flowchart 500 (FIG. 5), and data protection enactor 112 may perform step 504 of flowchart 500. Data protection system 600 is an example of the corresponding portion of data protection system 136 shown in FIG. 1, and for ease of illustration, not all features of system 600 are shown in FIG. 6. Data protection system 600 may be included in computing device 102. Data protection system 600 is described as follows.

In the embodiment of FIG. 6, contextual trigger monitor 110 is configured to use as a contextual trigger for data protection the detected presence or absence of certain user input and/or user input behaviors during a user login state. A user login state may comprise a state in which a user login process is executing on computing device 102. A user login process may comprise a process that requires a user to provide certain user input in order to gain access to one or more resource of computing device 102. An example of a user login state includes, but is not limited to, a state in which a user login screen or other user interface is presented to a user of computing device 102, the user interface providing a means by which the user can enter a password and/or other input to obtain access to one or more resources of computing device 102, and in which a user interacts with such interface to provide the password and/or other input.

In accordance with the embodiment shown in FIG. 6, user input monitoring logic 604 may be configured to determine whether particular user input, such as a particular user password, has been entered by a user when logging in to computing device 102. As used herein, the term password encompasses any sequence of characters used for user authentication to prove identity or obtain access to a resource. Thus, the term encompasses passphrases, passcodes, personal identification numbers (PINs), and the like. A password may also comprise other types of input. For example, a "picture password" may comprise one or more predefined interactions (e.g., via a touchscreen or pointing device) with a particular picture. A password could also comprise other types of user inputs as well. Still further, in addition to manual user input, a password may comprise audio user input (e.g., spoken words) or visual user input (e.g. gestures).

User input monitoring logic 604 may also be configured to determine whether a particular user input behavior is present or absent during the user login state. The particular user input behavior may be a behavior that suggests that the user is or is not an owner or authorized user of computing device 102. For example, it may be determined (e.g., through monitoring or explicit configuration) that the owner or authorized user of computing device 102 tends to enter her password at a speed that is within a particular range of speeds. In further accordance with this example, user input monitoring logic 604 may be configured to determine whether a user has entered a password at a speed that is within the particular range. If the user has not entered the password at the speed that is within the particular range, then this may indicate that the user is not the owner or authorized user of computing device 102. As another example, it may be determined (e.g., through monitoring or explicit configuration) that the owner or authorized user of computing device 102 tends to enter her password with a measure of regularity that is within a particular range. In further accordance with this example, user input monitoring logic 604 may be configured to determine whether a user has entered a password with a measure of regularity that is within the particular range. If the user has not entered the password with a measure of regularity that is within the particular range, then this may indicate that the user is not the owner or authorized user of computing device 102. As will be appreciated by persons skilled in the relevant art(s), a wide variety of other user input behaviors may be defined via monitoring or explicit configuration and used to determine whether or not a current user of computing device 102 is the owner or authorized user of that device.

In another embodiment, the user input behavior may be the provision by the user of additional input beyond a password, such as the pressing of one or more particular keys or buttons before and/or after entering a password or entering one or more particular characters before and/or after entering a password. For example, the additional input could comprise pressing a special key (e.g., Ctrl) before entering the password and/or pressing a special key after entering the password. The additional input could comprise any other form of user input, including any form of manual input, audio input, and gesture-based input. The owner or authorized user may configure or select such additional user input and then endeavor to keep such additional user input secret so that unauthorized users would not be aware of it.

User input monitoring logic 604 generates output 608 which is provided to mode selection logic 606. Output 608 may comprise a determination as to whether a particular password has been entered during the user login state. Output 608 may also comprise a determination as to whether at least one user input behavior is present in the user login state. Mode selection logic 606 receives output 608 and based on the determination(s) included therein, selectively activates one of a plurality of operating modes of computing device 102.

For example, in one embodiment, mode selection logic 606 operates as follows. If user input monitoring logic 604 determines that the user has not entered any password or has entered an incorrect password, then mode selection logic 606 activates a mode in which the user cannot access any sensitive or non-sensitive data on computing device 102. For example, mode selection logic 606 may cause computing device 102 to enter or remain in a mode in which access is denied to some, substantially all, or all of the features of computing device 102, including any data-accessing features of computing device 102. Alternatively, mode selection logic 606 may cause computing device 102 to shut down in response to determining that no password or an incorrect password has been entered.

In further accordance with this embodiment, if user input monitoring logic 604 determines that the user has entered a correct password and that one or more required user input behavior(s) have been detected, then mode selection logic 606 activates a mode of operation in which sensitive and non-sensitive data stored on computing device 102 are both visible and accessible to the user. This essentially comprises a normal or "open" operating mode in which no data protection measures are enacted by data protection enactor 112.

In still further accordance with this embodiment, if user input monitoring logic 606 determines that the user has entered a correct password but that a required user input behavior has not been detected, then mode selection logic 606 activates a mode of operation in which non-sensitive data stored on computing device 102 is visible and accessible to the user but sensitive data stored on computing device 102 is rendered invisible and/or inaccessible to the user. This may involve sending a signal 612 to data protection enactor 112 that causes data protection enactor 112 to implement the various data protection responses assigned to the sensitive data stored on computing device 102. As was previously noted, such data protection responses may include but are not limited to hard deleting an item of sensitive data, soft deleting an item of sensitive data, causing file system requests for an item of sensitive data to be ignored, disabling an item of sensitive data from being opened and closing or hiding a window in which an item of sensitive data is displayed.

Data protection enactor 112 may enact the data protection responses in security properties 122 associated with data 124. As shown in FIG. 6, data protection enactor 112 receives a data protection response 614 from security properties 122 associated with data 124. Data protection response 614 indicates the one or more data protection responses to be performed by data protection enactor 112 if signal 612 received from mode selection logic 606 indicates that data protection is to be enacted for data 124.

The foregoing approach to selective mode activation is advantageous in situations in which an unauthorized user steals or otherwise improperly obtains a password from the owner or authorized user of computing device 102. In such a situation, the unauthorized user may use the password to pass the user login requirements of computing device 102 and enter a seemingly normal mode of operation. However, the unauthorized user may be unaware of the additional user input behavior(s) necessary to obtain access to both sensitive data and non-sensitive data and therefore fail to act in accordance with such behavior(s). Consequently, unbeknownst to the unauthorized user, computing device 102 may be placed in a data protection mode in which only non-sensitive data is visible/accessible and sensitive data is rendered invisible and/or inaccessible. This can serve to better protect the sensitive data stored on computing device 102 as well as the welfare and safety of the owner or authorized user thereof.

The foregoing approach to data protection will now be described in reference to flowchart 700 of FIG. 7. In particular, FIG. 7 depicts a flowchart 700 of a process for enacting a data protection response for data based on the detected presence or absence of certain user input and/or input behaviors during a login state of a computing device, according to an example embodiment.

Figure 7:
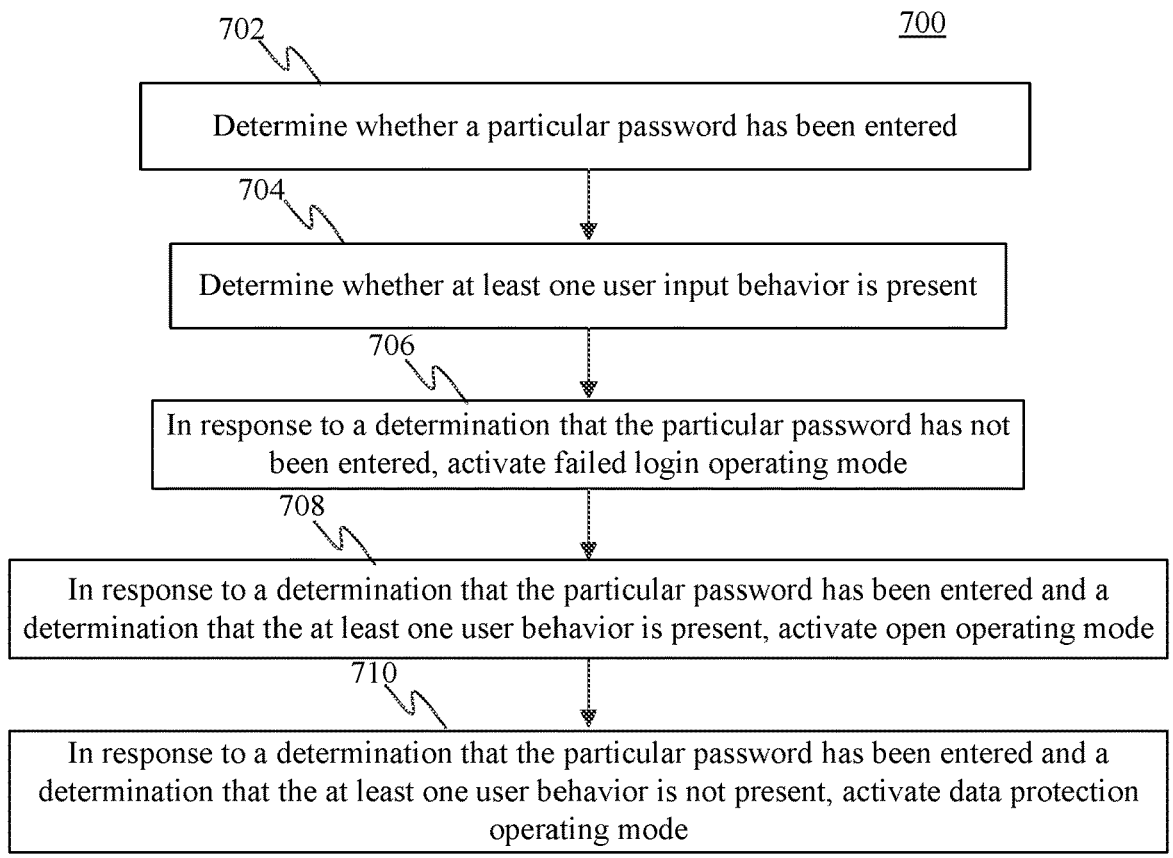
FIG. 7 depicts a flowchart of a process for enacting a data protection response for data based on the detected presence or absence of certain user input and/or input behaviors during a login state of a computing device, according to an example embodiment.

Referring to FIG. 7, the method of flowchart 700 begins with step 702. In step 702, it is determined whether a particular password has been entered. For instance, as described above, user input monitoring logic 604 may determine whether a user of computing device 102 has entered a particular password via a user interface thereof.

In step 704, it is determined whether at least one user behavior is present. For instance, as described above, user input monitoring logic 604 may determine whether a user input behavior is present. This step may involve, for example, determining whether the particular password was entered by the user at a speed that is within a predefined range. This step may also involve, for example, determining whether or not a measure of regularity associated with the entry of the particular password by the user is within a predefined range. As another example, this step may involve determining whether the user has provided particular input in addition to the particular password. As was previously discussed, such additional input may include but is not limited to the pressing of one or more particular keys or buttons before and/or after entering the particular password or entering one or more particular characters before and/or after entering the particular password.

In step 706, in response to a determination that the particular password has not been entered, a failed login operating mode is activated. For instance, in response to receiving a determination from user input monitoring logic 604 that the particular password has not been entered (e.g., due to no password being entered or an incorrect password being entered), mode selection logic 606 may cause a failed login operating mode to be activated. The failed operating mode may comprise a mode in which the user cannot access any sensitive or non-sensitive data on computing device 102. For example, activating the failed login operating mode may involve causing computing device 102 to enter or remain in a mode in which access is denied to some, substantially all, or all of the features of computing device 102, including any data-accessing features of computing device 102. In some embodiments, the failed login operating mode may comprise simply not allowing the user past the user login state. Alternatively, the failed operating mode may involve shutting down computing device 102 or performing some other action that bars the user from accessing data on the device.

In step 708, in response to a determination that the particular password has been entered and a determination that the at least one user behavior is present, an open operating mode is activated. For instance, in response to receiving a determination from user input monitoring logic 604 that the particular password has been entered and a determination that the at least one user behavior is present, mode selection logic 606 may cause an open operating mode to be activated. The open operating mode may comprise a mode in which all sensitive and non-sensitive data stored on computing device 102 is visible and accessible to the user (i.e., a mode in which data protection responses have not been enacted by data protection enactor 112).

In step 710, in response to a determination that the particular password has been entered and a determination that the at least one user behavior is not present, a data protection operating mode is activated. For instance, in response to receiving a determination from user input monitoring logic 604 that the particular password has been entered and a determination that the at least one user behavior is not present, mode selection logic 606 may send signal 612 to data protection enactor 112 to cause data protection enactor 112 to enter computing device 102 into a data protection mode. As was previously described, during the data protection mode, data protection enactor 112 may implement the various data protection responses assigned to the sensitive data stored on computing device 102 to render such sensitive data invisible and/or inaccessible to a user. As was previously noted, such data protection responses may include but are not limited to hard deleting an item of sensitive data, soft deleting an item of sensitive data, causing file system requests for an item of sensitive data to be ignored, disabling an item of sensitive data from being opened and closing or hiding a window in which an item of sensitive data is displayed.

Figure 8:
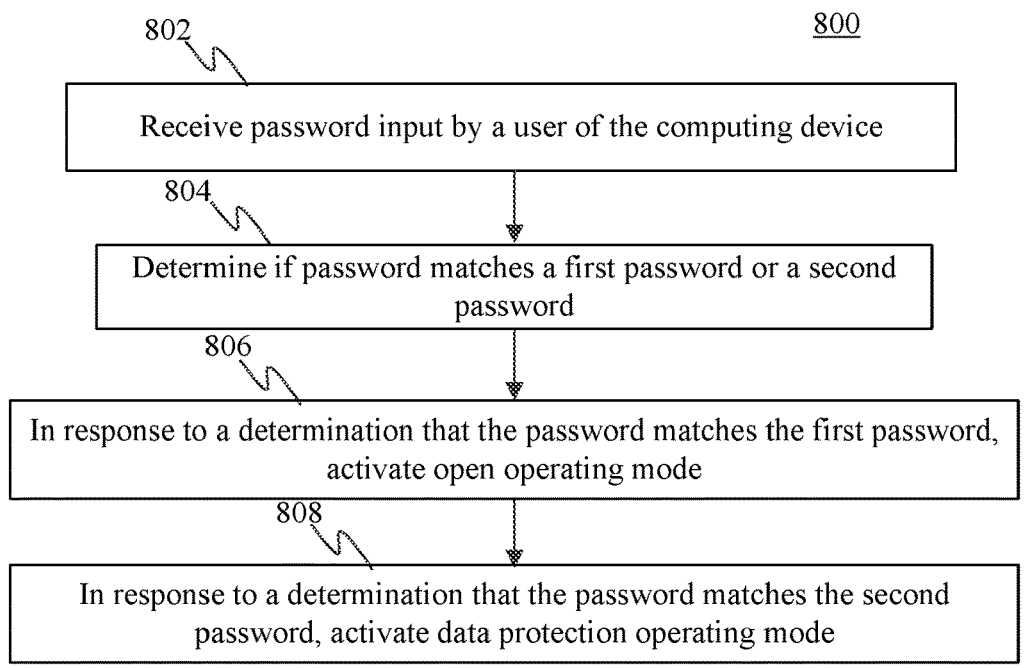
FIG. 8 depicts a flowchart of another process for enacting a data protection response for data based on the detected presence or absence of certain user input and/or input behaviors during a login state of a computing device, according to an example embodiment.

FIG. 8 depicts a flowchart 800 of another process for enacting a data protection response for data based on the detected presence or absence of certain user input and/or input behaviors during a login state of a computing device, according to an example embodiment. In the embodiment that will now be described with reference to FIG. 8, there are at least two passwords that can enable a user to pass through a user login interface. A first password causes the device to be activated in the above-described open operating mode described above while the second password causes the device to be activated in the above-described data protection operating mode. This embodiment is advantageous in that, if an owner or authorized user of computing device 102 is required to give out her password to an unauthorized user or any other person, she can give out the second password and thereby limit an unauthorized access to accessing non-sensitive data only. Moreover, in such a scenario, the unauthorized user may not be aware that sensitive data has been concealed and/or deleted.

Referring to FIG. 8, flowchart 800 begins with step 802. In step 802, a password that is input by a user of a computing device is received. For instance, as described above, user input monitoring logic 604 may receive a password input by a user of computing device 102.

In step 804, it is determined whether the password received during step 802 matches a first password or a second password. For instance, user input monitoring logic 604 may compare the password received during step 802 to a first password and a second password to see if it matches either the first password or second password.

In step 806, in response to a determination that the password matches the first password, an open operating mode is activated. For instance, in response to receiving a determination from user input monitoring logic 604 that the password received during step 802 matches the first password, mode selection logic 606 may cause an open operating mode to be activated. The open operating mode may comprise a mode in which all sensitive and non-sensitive data stored on computing device 102 is visible and accessible to the user (i.e., a mode in which data protection responses have not been enacted by data protection enactor 112).

In step 808, in response to a determination that the password matches the second password, a data protection operating mode is activated. For instance, in response to receiving a determination from user input monitoring logic 604 that the password received during step 802 matches the second password, mode selection logic 606 may send signal 612 to data protection enactor 112 to cause data protection enactor 112 to enter computing device 102 into a data protection mode. As was previously described, during the data protection mode, data protection enactor 112 may implement the various data protection responses assigned to the sensitive data stored on computing device 102 to render such sensitive data invisible and/or inaccessible to a user. As was previously noted, such data protection responses may include but are not limited to hard deleting an item of sensitive data, soft deleting an item of sensitive data, causing file system requests for an item of sensitive data to be ignored, disabling an item of sensitive data from being opened and closing or hiding a window in which an item of sensitive data is displayed.

As was discussed above, during a data protection mode of operation, data protection enactor 112 may cause selected items of sensitive data (e.g., selected files and/or folders) to be soft deleted. Such soft deletion may comprise, for example, creating a secure backup copy of links or file pointers to the items of sensitive data (e.g., by storing an encrypted copy of the links or file pointers on computing device 102 or on a remote device) and then deleting such links or file pointers so that they are not accessible to an operating system and/or file system of computing device 102. In accordance with such an embodiment, the soft deleted data may be recovered by restoring the deleted links or file pointers from the secure backup copy to computing device 102.

In one embodiment, sensitive data that is soft deleted as a result of the performance of step 710 of FIG. 7 or step 808 of FIG. 8 may later be recovered when a user subsequently tries to log on to computing device 102. For example, with reference to the embodiment of FIG. 7, soft deleted data may be recovered when a user subsequently tries to log in to computing device 102 and (i) the correct password is provided and (ii) the appropriate user input behavior(s) are detected. As another example, with reference to the embodiment of FIG. 8, soft deleted data may be recovered when a user subsequently tries to log in to computing device 102 and provides the first password rather than the second password.

Figure 9:
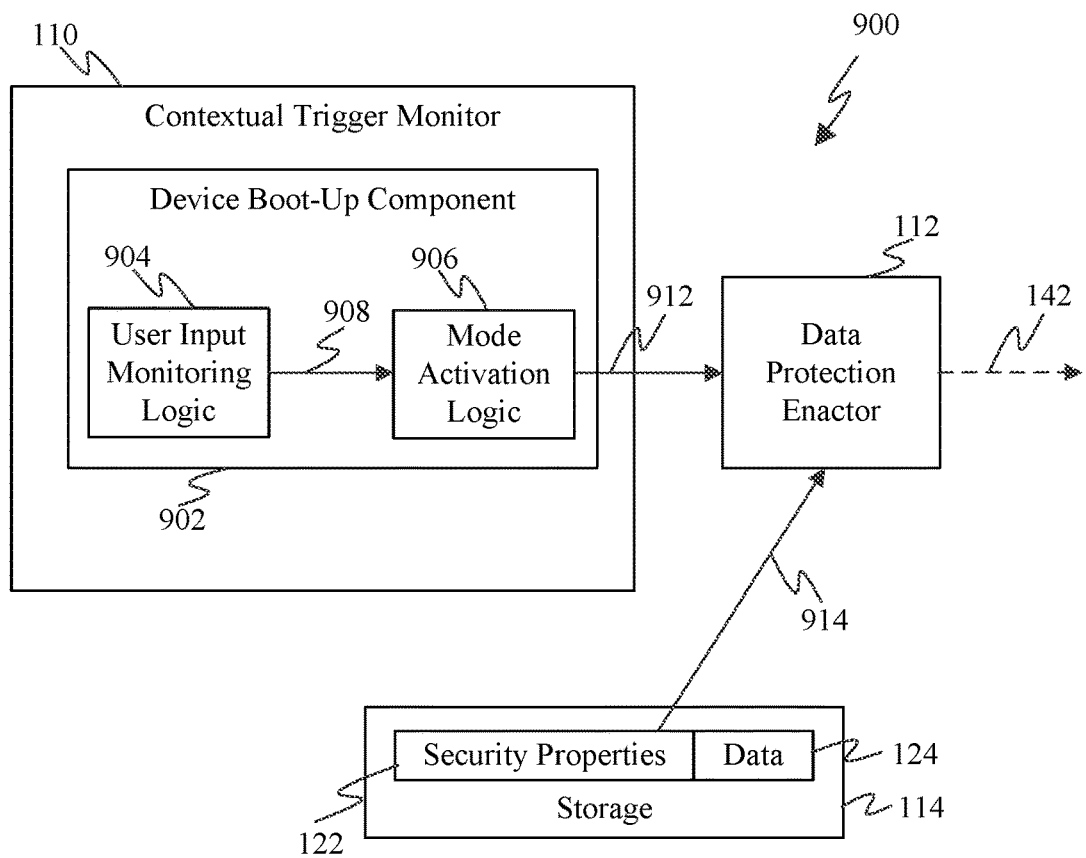
FIG. 9 is a block diagram of a data protection system configured to use the detected presence or absence of certain user input and/or user input behaviors during a boot-up state of a computing device as a contextual trigger for data protection, according to an example embodiment.

IV. Example Contextual Triggers Based on Detected Presence or Absence of Certain User Input and/or User Input Behaviors During Boot-Up State Contextual trigger monitor 110 may be configured in various ways to monitor for triggers indicating that data is exposed to or threatened with unauthorized access. For instance, FIG. 9 is a block diagram of a portion of a data protection system 900 that is configured to use as a contextual trigger the detected presence or absence of certain user input and/or user input behaviors during a boot-up state of a computing device, according to an example embodiment. As shown in FIG. 9, data protection system 900 includes contextual trigger monitor 110 and data protection enactor 112. Furthermore, contextual trigger monitor 110 includes a device boot-up component 902 that comprises user input monitoring logic 904 and mode selection logic 906. In an embodiment, contextual trigger monitor 110 may perform step 502 of flowchart 500 (FIG. 5), and data protection enactor 112 may perform step 504 of flowchart 500. Data protection system 900 is an example of the corresponding portion of data protection system 136 shown in FIG. 1, and for ease of illustration, not all features of system 900 are shown in FIG. 9. Data protection system 900 may be included in computing device 102. Data protection system 900 is described as follows.

In the embodiment of FIG. 9, contextual trigger monitor 110 is configured to use as a contextual trigger for data protection the detected presence or absence of certain user input and/or user input behaviors during a device boot-up state. A device boot-up state may comprise a state in which an operating system and/or other software necessary for operation of computing device 102 is being loaded into system memory and executed therefrom. A device boot-up state may be initiated by powering on computing device 102 or via some other means. The boot-up state may be complete when the normal, operative runtime environment of computing device 102 is attained. However, this definition is not intended to be limiting, and device boot-up state may generally refer to any period of time during which operation of computing device 102 is being initialized.

In accordance with the embodiment shown in FIG. 9, user input monitoring logic 904 may be configured to determine whether particular user input, such as a particular key or button press or a particular sequence of key and/or button presses, has been entered by a user while computing device 102 is in a boot-up state. These key and/or button presses may be detected by user input monitoring logic 904 as one or more hardware interrupts from one or more user input devices. User input monitoring logic 904 may also be configured to determine whether the particular input has been entered by the user during the boot-up state by determining if a particular password has been entered by the user during the device boot-up state and/or by determining whether one or more user input behaviors are present during the device boot-up state. A discussion of user input behaviors was provided above in reference to FIGS. 6-8 and will not be provided here for the sake of brevity. The particular input is also not limited to manually-entered input but may comprise audio input (e.g., speech) or visual input (e.g., gestures), provided that user computing device 102 includes sensors capable of detecting such input during the boot-up state.

User input monitoring logic 904 generates output 908 which is provided to mode selection logic 906. Output 908 may comprise a determination as to whether a particular user input has been received during the boot-up state. Mode selection logic 906 receives output 908 and based on the determination(s) included therein, selectively activates one of a plurality of operating modes of computing device 102.

For example, in one embodiment, mode selection logic 906 operates as follows. If user input monitoring logic 904 determines that the user has provided the particular user input during the boot-up state (e.g., a particular key or button press or a particular sequence of key and/or button presses as discussed above), then mode selection logic 906 activates a mode of operation in which sensitive and non-sensitive data stored on computing device 102 are both visible and accessible to the user. This essentially comprises a normal or "open" operating mode in which no data protection measures are enacted by data protection enactor 112. Computing device 102 may be configured to further require that a user password or other credentials be entered to gain access to this open operating mode.

In still further accordance with this embodiment, if user input monitoring logic 906 determines that the user has not entered any input during the boot-up state or that the user has provided some user input during the boot-up state that is not the particular user input, then mode selection logic 906 activates a mode of operation in which non-sensitive data stored on computing device 102 is visible and accessible to the user but sensitive data stored on computing device 102 is rendered invisible and/or inaccessible to the user. This may involve sending a signal 912 to data protection enactor 112 that causes data protection enactor 112 to implement the various data protection responses assigned to the sensitive data stored on computing device 102. As was previously noted, such data protection responses may include but are not limited to hard deleting an item of sensitive data, soft deleting an item of sensitive data, causing file system requests for an item of sensitive data to be ignored, disabling an item of sensitive data from being opened and closing or hiding a window in which an item of sensitive data is displayed. Computing device 102 may be configured to further require that a user password or other credentials be entered to gain access to this data protection operating mode.

Data protection enactor 112 may enact the data protection responses in security properties 122 associated with data 124. As shown in FIG. 9, data protection enactor 112 receives a data protection response 914 from security properties 122 associated with data 124. Data protection response 914 indicates the one or more data protection responses to be performed by data protection enactor 112 if signal 912 received from mode selection logic 906 indicates that data protection is to be enacted for data 124.

The foregoing approach to selective mode activation is advantageous in situations in which an unauthorized user steals or otherwise improperly obtains computing device 102. If the unauthorized user does not know the particular input that must be provided during the boot-up state, the unauthorized user may unwittingly cause the data protection mode to be activated by powering on the device but failing to provide the particular input. This may be true even if the unauthorized user knows a password for logging in to computing device 102.

The foregoing approach to data protection will now be described in reference to flowchart 1000 of FIG. 10. In particular, FIG. 10 depicts a flowchart 1000 of a process for enacting a data protection response for data based on the detected presence or absence of certain user input and/or input behaviors during a boot-up state or process of a computing device, according to an example embodiment.

Figure 10:
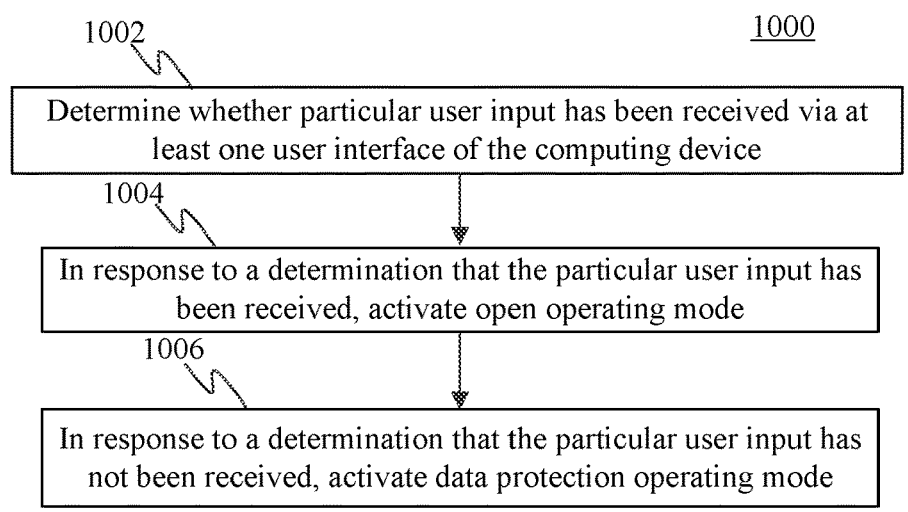
FIG. 10 depicts a flowchart of a process for enacting a data protection response for data based on the detected presence or absence of certain user input and/or user input behaviors during a boot-up state or process of a computing device, according to an example embodiment.

Referring to FIG. 10, the method of flowchart 1000 begins with step 1002. In step 1002, it is determined whether particular user input has been received via at least one user interface of a computing device during a boot-up process. For instance, as described above, user input monitoring logic 904 may determine whether particular user input has been received via at least one user interface of computing device 102 during a boot-up process thereof. In an embodiment, the particular input may comprise the pressing of one or more particular keys and/or buttons. In another embodiment the particular input may comprise a particular password. In a still further embodiment, step 1002 may also include determining whether one or more user input behaviors are present during the boot-up process.

In step 1004, in response to a determination that the particular user input has been received via the at least one user interface during the boot-up process, an open operating mode is activated. For instance, in response to receiving a determination from user input monitoring logic 904 that the particular user input has been received via the at least one user interface during the boot-up process, mode selection logic 906 may cause an open operating mode to be activated. The open operating mode may comprise a mode in which all sensitive and non-sensitive data stored on computing device 102 is visible and accessible to the user (i.e., a mode in which data protection responses have not been enacted by data protection enactor 112).

In step 1006, in response to a determination that the particular user input has not been received via the at least one user interface during the boot-up process, a data protection operating mode is activated. For instance, in response to receiving a determination from user input monitoring logic 604 that the particular user input has not been received via the at least one user interface during the boot-up process, mode selection logic 906 may send signal 912 to data protection enactor 112 to cause data protection enactor 112 to enter computing device 102 into a data protection mode. As was previously described, during the data protection mode, data protection enactor 112 may implement the various data protection responses assigned to the sensitive data stored on computing device 102 to render such sensitive data invisible and/or inaccessible to a user. As was previously noted, such data protection responses may include but are not limited to hard deleting an item of sensitive data, soft deleting an item of sensitive data, causing file system requests for an item of sensitive data to be ignored, disabling an item of sensitive data from being opened and closing or hiding a window in which an item of sensitive data is displayed.

As was discussed above, during a data protection mode of operation, data protection enactor 112 may cause selected items of sensitive data (e.g., selected files and/or folders) to be soft deleted. Such soft deletion may comprise, for example, creating a secure backup copy of links or file pointers to the items of sensitive data (e.g., by storing an encrypted copy of the links or file pointers on computing device 102 or on a remote device) and then deleting such links or file pointers so that they are not accessible to an operating system and/or file system of computing device 102. In accordance with such an embodiment, the soft deleted data may be recovered by restoring the deleted links or file pointers from the secure backup copy to computing device 102.

In one embodiment, sensitive data that is soft deleted as a result of the performance of step 1006 of FIG. 10 may later be recovered when a user subsequently powers on computing device 102 and provides the correct user input (i.e., the particular user input referred to in step 1002) during the boot-up process. In an alternate embodiment, sensitive data that is soft deleted as a result of the performance of step 1006 of FIG. 10 may later be recovered when a user subsequently powers on computing device 102 and provides a different user input during the boot-up process (e.g., special user input for initiating a recovery mode that is different than the particular user input referred to in step 1002).

Figure 11:
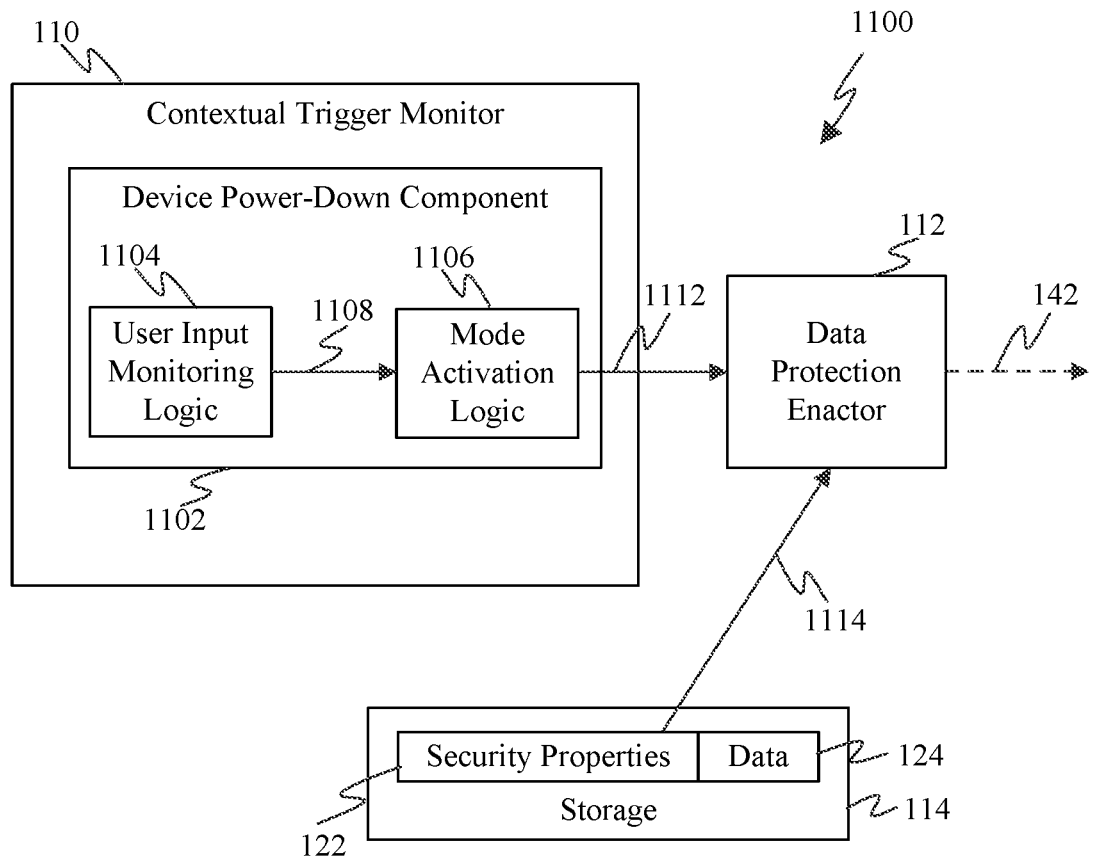
FIG. 11 is a block diagram of a data protection system configured to use the detected presence or absence of certain user input and/or user input behaviors during a shut-down state of a computing device as a contextual trigger for data protection, according to an example embodiment.

V. Example Contextual Triggers Based on Detected Presence or Absence of Certain User Input and/or User Input Behaviors During Shut-Down State Contextual trigger monitor 110 may be configured in various ways to monitor for triggers indicating that data is exposed to or threatened with unauthorized access. For instance, FIG. 11 is a block diagram of a portion of a data protection system 1100 that is configured to use as a contextual trigger the detected presence or absence of certain user input and/or user input behaviors during a shut-down state of a computing device, according to an example embodiment. As shown in FIG. 11, data protection system 1100 includes contextual trigger monitor 110 and data protection enactor 112. Furthermore, contextual trigger monitor 110 includes a device shut-down component 1102 that comprises user input monitoring logic 1104 and mode selection logic 1106. In an embodiment, contextual trigger monitor 110 may perform step 502 of flowchart 500 (FIG. 5), and data protection enactor 112 may perform step 504 of flowchart 500. Data protection system 1100 is an example of the corresponding portion of data protection system 136 shown in FIG. 1, and for ease of illustration, not all features of system 1100 are shown in FIG. 11. Data protection system 1100 may be included in computing device 102. Data protection system 1100 is described as follows.

In the embodiment of FIG. 11, contextual trigger monitor 110 is configured to use as a contextual trigger for data protection the detected presence or absence of certain user input and/or user input behaviors during a device shut-down state. A device shut-down state may comprise a state in which an operating system and/or other software processes executing on computing device 102 are being suspended or terminated and one or more hardware components of computing device 102 are being powered down. A device shut-down state may be initiated by powering off computing device 102 or via some other means. However, this definition is not intended to be limiting, and device shut-down state may generally refer to any period of time during which some operation of computing device 102 is being suspended or terminated.

In accordance with the embodiment shown in FIG. 11, user input monitoring logic 1104 may be configured to determine whether particular user input, such as a particular password, has been entered by a user while computing device 102 is in a shut-down state. User input monitoring logic 1104 may also be configured to determine whether other types of user input have been entered by the user during the shut-down state. Still further, user input monitoring logic 1104 may be configured to determine whether one or more user input behaviors are present during the device shut-down state. A discussion of user input behaviors was provided above in reference to FIGS. 6-8 and will not be provided here for the sake of brevity. The particular input is also not limited to manually-entered input but may comprise audio input (e.g., speech) or visual input (e.g., gestures), provided that user computing device 102 includes sensors capable of detecting such input during the shut-down state.

User input monitoring logic 1104 generates output 1108 which is provided to mode selection logic 1106. Output 1108 may comprise a determination as to whether a particular user input has been received during the shut-down state. Mode selection logic 1106 receives output 1108 and based on the determination(s) included therein, selectively activates or does not activate a data protection operating mode of computing device 102.

For example, in one embodiment, mode selection logic 1106 operates as follows. If user input monitoring logic 1104 determines that the user has provided the particular user input during a particular time window in the shut-down state or process (e.g., a particular password as discussed above), then mode selection logic 1106 will not activate a data protection mode in which sensitive data stored on computing device 102 is rendered invisible and/or inaccessible. However, if user input monitoring logic 1106 determines that the user has not entered the particular user input during the particular time window in the shut-down state or process, then mode selection 1106 will active the data protection mode. This may involve sending a signal 1112 to data protection enactor 112 that causes data protection enactor 112 to implement the various data protection responses assigned to the sensitive data stored on computing device 102. As was previously noted, such data protection responses may include but are not limited to hard deleting an item of sensitive data, soft deleting an item of sensitive data, causing file system requests for an item of sensitive data to be ignored, disabling an item of sensitive data from being opened and closing or hiding a window in which an item of sensitive data is displayed. Computing device 102 may be configured to further require that a user password or other credentials be entered to gain access to this data protection operating mode.

Data protection enactor 112 may enact the data protection responses in security properties 122 associated with data 124. As shown in FIG. 11, data protection enactor 112 receives a data protection response 1114 from security properties 122 associated with data 124. Data protection response 1114 indicates the one or more data protection responses to be performed by data protection enactor 112 if signal 1112 received from mode selection logic 1106 indicates that data protection is to be enacted for data 124.

The foregoing approach to selective mode activation is advantageous in situations in which an unauthorized user steals or otherwise improperly obtains computing device 102. If the unauthorized user does not know the particular input that must be provided during the shut-down state, the unauthorized user may unwittingly cause the data protection mode to be activated by powering off the device but failing to provide the particular input. This may be true even if the unauthorized user knows a password for logging in to computing device 102.

The foregoing approach to data protection will now be described in reference to flowchart 1200 of FIG. 12. In particular, FIG. 12 depicts a flowchart 1200 of a process for enacting a data protection response for data based on the detected presence or absence of certain user input and/or input behaviors during a shut-down state or process of a computing device, according to an example embodiment.

Figure 12:
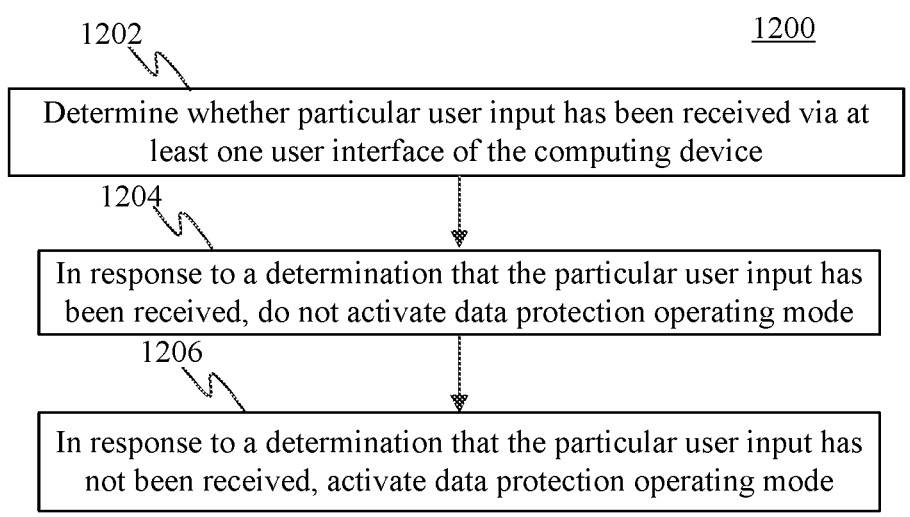
FIG. 12 depicts a flowchart of a process for enacting a data protection response for data based on the detected presence or absence of certain user input and/or user input behaviors during a shut-down state of a computing device, according to an example embodiment.

Referring to FIG. 12, the method of flowchart 1200 begins with step 1202. In step 1202, it is determined whether particular user input has been received via at least one user interface of a computing device during a shut-down process. For instance, as described above, user input monitoring logic 1104 may determine whether particular user input has been received via at least one user interface of computing device 102 during a shut-down process thereof. In an embodiment, the particular input may comprise the pressing of one or more particular keys and/or buttons. In another embodiment the particular input may comprise a particular password. In a still further embodiment, step 122 may also include determining whether one or more user input behaviors are present during the shut-down process.

In step 1204, in response to a determination that the particular user input has been received via the at least one user interface during the shut-down process, a data protection operating mode is not activated. For instance, in response to receiving a determination from user input monitoring logic 1104 that the particular user input has been received via the at least one user interface during the shut-down process, mode selection logic 1106 may not activate a data protection operating mode.

In step 1206, in response to a determination that the particular user input has not been received via the at least one user interface during the shut-down process, a data protection operating mode is activated. For instance, in response to receiving a determination from user input monitoring logic 1104 that the particular user input has not been received via the at least one user interface during the shut-down process, mode selection logic 1106 may send signal 1112 to data protection enactor 112 to cause data protection enactor 112 to enter computing device 102 into a data protection mode. As was previously described, during the data protection mode, data protection enactor 112 may implement the various data protection responses assigned to the sensitive data stored on computing device 102 to render such sensitive data invisible and/or inaccessible to a user. As was previously noted, such data protection responses may include but are not limited to hard deleting an item of sensitive data, soft deleting an item of sensitive data, causing file system requests for an item of sensitive data to be ignored, disabling an item of sensitive data from being opened and closing or hiding a window in which an item of sensitive data is displayed.

As was discussed above, during a data protection mode of operation, data protection enactor 112 may cause selected items of sensitive data (e.g., selected files and/or folders) to be soft deleted. Such soft deletion may comprise, for example, creating a secure backup copy of links or file pointers to the items of sensitive data (e.g., by storing an encrypted copy of the links or file pointers on computing device 102 or on a remote device) and then deleting such links or file pointers so that they are not accessible to an operating system and/or file system of computing device 102. In accordance with such an embodiment, the soft deleted data may be recovered by restoring the deleted links or file pointers from the secure backup copy to computing device 102.

In one embodiment, sensitive data that is soft deleted as a result of the performance of step 1206 of FIG. 12 may later be recovered when a user subsequently powers on computing device 102 and provides a particular user input during the boot-up process. In an alternate embodiment, sensitive data that is soft deleted as a result of the performance of step 1206 of FIG. 12 may later be recovered when a user subsequently powers on computing device 102 and provides a correct password during a user login state or process. In a still further embodiment, sensitive data that is soft deleted as a result of the performance of step 1206 of FIG. 12 may later be recovered when a user subsequently powers on computing device 102 and provides a correct password during a user login state or process and one or more particular user input behaviors are detected.

VI. Example Mobile and Stationary Device Embodiments

Figure 13:
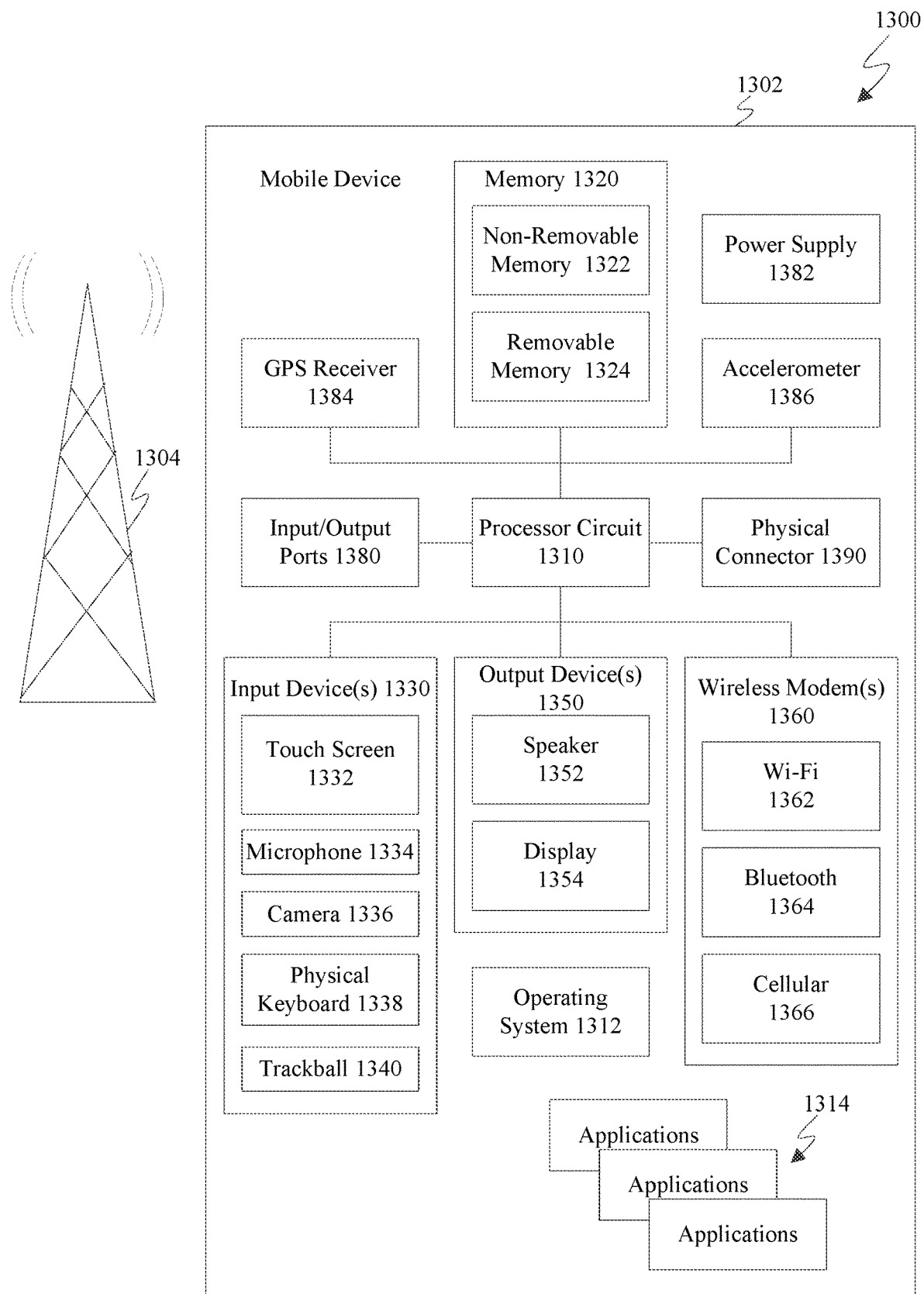
FIG. 13 is a block diagram of an exemplary mobile device that may be used to implement various embodiments described herein.

FIG. 13 is a block diagram of an exemplary mobile device 1302 that may be used to implement end user computing device 102 as described above in reference to FIG. 1. As shown in FIG. 13, mobile device 1302 includes a variety of optional hardware and software components. Any component in mobile device 1302 can communicate with any other component, although not all connections are shown for ease of illustration. Mobile device 1302 can be any of a variety of computing devices (e.g., cell phone, smartphone, handheld computer, Personal Digital Assistant (PDA), etc.) and can allow wireless two-way communications with one or more mobile communications networks 1304, such as a cellular or satellite network, or with a local area or wide area network.

The illustrated mobile device 1302 can include a processor circuit 1310 (e.g., signal processor, microprocessor, ASIC, or other control and processing logic circuitry) for performing such tasks as signal coding, data processing, input/output processing, power control, and/or other functions. An operating system 1312 can control the allocation and usage of the components of mobile device 1302 and support for one or more application programs 1314 (also referred to as "applications" or "apps"). Application programs 1314 may include common mobile computing applications (e.g., e-mail, calendar, contacts, Web browser, and messaging applications) and any other computing applications (e.g., word processing, mapping, and media player applications). In one embodiment, operating system 1312 or an application program 1314 includes one of data protection management system 136 as described above in reference to FIG. 1, data protection management system 600 as described above in reference to FIG. 6, data protection management system 900 as described above in reference to FIG. 9, or data protection management system 1100 as described above in reference to FIG. 11.

The illustrated mobile device 1302 can include memory 1320. Memory 1320 can include non-removable memory 1322 and/or removable memory 1324. Non-removable memory 1322 can include RAM, ROM, flash memory, a hard disk, or other well-known memory devices or technologies. Removable memory 1324 can include flash memory or a Subscriber Identity Module (SIM) card, which is well known in GSM communication systems, or other well-known memory devices or technologies, such as "smart cards." Memory 1320 can be used for storing data and/or code for running operating system 1312 and applications 1314. Example data can include Web pages, text, images, sound files, video data, or other data to be sent to and/or received from one or more network servers or other devices via one or more wired or wireless networks. Memory 1320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. In an embodiment, memory 1320 includes storage 114.

Mobile device 1302 can support one or more input devices 1330, such as a touch screen 1332, a microphone 1334, a camera 1336, a physical keyboard 1338 and/or a trackball 1340 and one or more output devices 1350, such as a speaker 1352 and a display 1354. Touch screens, such as touch screen 1332, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens.

Other possible output devices (not shown) can include piezoelectric or other haptic output devices. Some devices can serve more than one input/output function. For example, touch screen 1332 and display 1354 can be combined in a single input/output device. The input devices 1330 can include a Natural User Interface (NUI).

Wireless modem(s) 1360 can be coupled to antenna(s) (not shown) and can support two-way communications between the processor 1310 and external devices, as is well understood in the art. The modem(s) 1360 are shown generically and can include a cellular modem 1366 for communicating with the mobile communication network 1304 and/or other radio-based modems (e.g., Bluetooth 1364 and/or Wi-Fi 1362). At least one of the wireless modem(s) 1360 is typically configured for communication with one or more cellular networks, such as a GSM network for data and voice communications within a single cellular network, between cellular networks, or between the mobile device and a public switched telephone network (PSTN).

Mobile device 1302 can further include at least one input/output port 1380, a power supply 1382, a satellite navigation system receiver 1384, such as a Global Positioning System (GPS) receiver, an accelerometer 1386 (as well as other sensors, including but not limited to a compass and a gyroscope), and/or a physical connector 1390, which can be a USB port, IEEE 1394 (FireWire) port, and/or RS-232 port. The illustrated components of mobile device 1302 are not required or all-inclusive, as any components can be deleted and other components can be added as would be recognized by one skilled in the art.

In an embodiment, certain components of mobile device 1302 are configured to perform any of the operations attributed to data protection management system 136 as described above in reference to FIG. 1, data protection management system 600 as described above in reference to FIG. 6, data protection management system 900 as described above in reference to FIG. 9, or data protection management system 1100 as described above in reference to FIG. 11. Computer program logic for performing the operations attributed to these components as described above may be stored in memory 1320 and executed by processor circuit 1310. By executing such computer program logic, processor circuit 1310 may be caused to implement any of the features of data protection management system 136 as described above in reference to FIG. 1, data protection management system 600 as described above in reference to FIG. 6, data protection management system 900 as described above in reference to FIG. 9, or data protection management system 1100 as described above in reference to FIG. 11. Also, by executing such computer program logic, processor circuit 1310 may be caused to perform any or all of the steps of any or all of the flowcharts depicted in FIGS. 2-5, 7, 8, 10 and 12.

Figure 14:
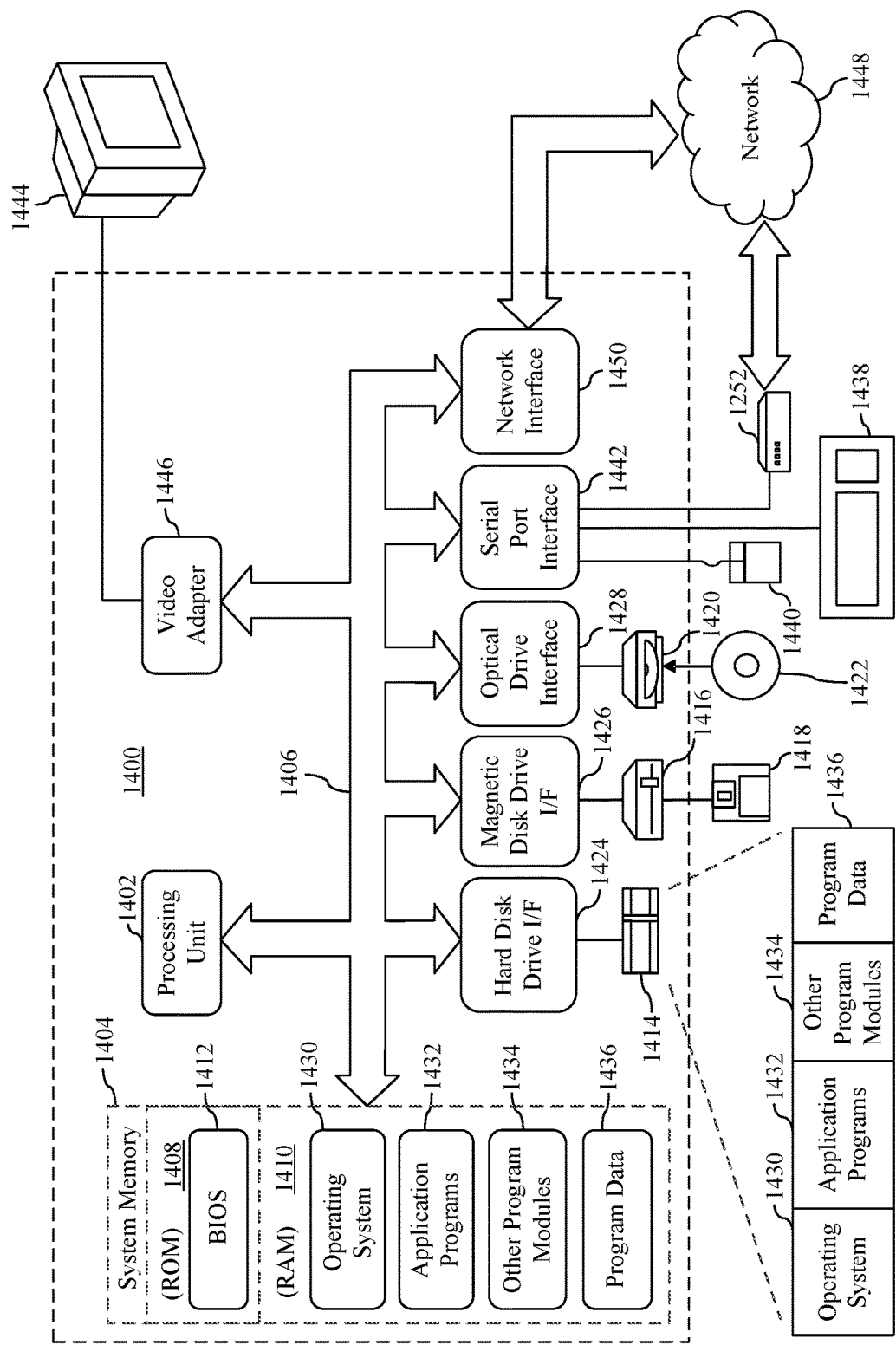
FIG. 14 is a block diagram of an example processor-based computer system that may be used to implement various embodiments described herein.

Furthermore, FIG. 14 depicts an example processor-based computer system 1400 that may be used to implement various embodiments described herein. For example, computer system 1400 may be used to implement end user computing device 102 or server 104 as described above in reference to FIG. 1. Computer system 1400 may also be used to implement any or all of the steps of any or all of the flowcharts depicted in FIGS. 2-5, 7, 8, 10 and 12. The description of computer system 1400 set forth herein is provided for purposes of illustration, and is not intended to be limiting. Embodiments may be implemented in further types of computer systems, as would be known to persons skilled in the relevant art(s).

As shown in FIG. 14, computer system 1400 includes a processing unit 1402, a system memory 1404, and a bus 1406 that couples various system components including system memory 1404 to processing unit 1402. Processing unit 1402 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computer system 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, BLU-RAY™ disk or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1430, one or more application programs 1432, other program modules 1434, and program data 1436. In accordance with various embodiments, the program modules may include computer program logic that is executable by processing unit 1402 to perform any or all of the functions and features of data protection management system 136 as described above in reference to FIG. 1, data protection management system 600 as described above in reference to FIG. 6, data protection management system 900 as described above in reference to FIG. 9, or data protection management system 1100 as described above in reference to FIG. 11. The program modules may also include computer program logic that, when executed by processing unit 1402, performs any of the steps or operations shown or described in reference to the flowcharts of FIGS. 2-5, 7, 8, 10 and 12.

A user may enter commands and information into computer system 1400 through input devices such as a keyboard 1438 and a pointing device 1440. Other input devices (not shown) may include a microphone, joystick, game controller, scanner, or the like. In one embodiment, a touch screen is provided in conjunction with a display 1444 to allow a user to provide user input via the application of a touch (as by a finger or stylus for example) to one or more points on the touch screen. These and other input devices are often connected to processing unit 1402 through a serial port interface 1442 that is coupled to bus 1406, but may be connected by other interfaces, such as a parallel port, game port, or a universal serial bus (USB). Such interfaces may be wired or wireless interfaces.

A display 1444 is also connected to bus 1406 via an interface, such as a video adapter 1446. In addition to display 1444, computer system 1400 may include other peripheral output devices (not shown) such as speakers and printers.

Computer system 1400 is connected to a network 1448 (e.g., a local area network or wide area network such as the Internet) through a network interface or adapter 1450, a modem 1452, or other suitable means for establishing communications over the network. Modem 1452, which may be internal or external, is connected to bus 1406 via serial port interface 1442.

As used herein, the terms "computer program medium," "computer-readable medium," and "computer-readable storage medium" are used to generally refer to memory devices or storage structures such as the hard disk associated with hard disk drive 1414, removable magnetic disk 1418, removable optical disk 1422, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1432 and other program modules 1434) may be stored on the hard disk, magnetic disk, optical disk, ROM, or RAM. Such computer programs may also be received via network interface 1450, serial port interface 1442, or any other interface type. Such computer programs, when executed or loaded by an application, enable computer system 1400 to implement features of embodiments of the present invention discussed herein. Accordingly, such computer programs represent controllers of computer system 1400.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, computer system 1400 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VII. Example Embodiments

A system in accordance with an embodiment comprises at least one processor and one or more memory devices connected to the at least one processor. The one or more memory devices store software components for execution by the at least one processor. The software components include a user login component. The user login component include monitoring logic and mode selection logic. The monitoring logic is configured to determine whether a particular password has been entered and to determine whether at least one user input behavior is present. The mode selection logic is configured to activate a first mode of operation of the computing device in response to a determination that the particular password has been entered and the at least one user input behavior is present, and to activate a second mode of operation of the computing device in response to determining that the particular password has been entered and the at least one user input behavior is not present. The first mode of operation of the computing device is a mode in which sensitive data stored on the computing device and non-sensitive data stored on the computing device are both visible and accessible to a user. The second mode of operation of the computing device is a mode in which the non-sensitive data stored on the computing device is visible and accessible to the user and the sensitive data stored on the computing device is rendered one or more of invisible to the user and inaccessible to the user.

In one embodiment of the foregoing system, the mode selection logic is further configured to activate a third mode of operation of the computing device in response to a determination that the particular password has not been entered. The third mode of operation of the computing device is a mode in which access is denied to the sensitive data stored on the computing device and the non-sensitive data stored on the computing device.

In another embodiment of the foregoing system, the monitoring logic is configured to determine whether the at least one user input behavior is present by determining whether the particular password was entered by the user at a speed that is within a predefined range.

In yet another embodiment of the foregoing system, the monitoring logic is configured to determine whether the at least one user input behavior is present by determining whether or not a measure of regularity associated with the entry of the particular password by the user is within a predefined range.

In still another embodiment of the foregoing system, the monitoring logic is configured to determine whether the at least one user input behavior is present by determining whether the user has provided particular input in addition to the particular password.

In a further embodiment of the foregoing system, the monitoring logic is configured to determine whether the user has provided the particular input by determining whether the user has pressed one or more particular keys or buttons before and/or after entering the particular password or determining whether the user has entered one or more particular characters before and/or after entering the particular password.

In a still further embodiment of the foregoing system, the second mode of operation of the computing device is a mode in which at least one item of sensitive data is rendered invisible to the user or inaccessible to the user by performing one or more of hard deleting the item of sensitive data, soft deleting the item of sensitive data, causing file system requests for the item of sensitive data to be ignored, disabling the item of sensitive data from being opened, and closing or hiding a window in which the item of data is displayed.

A method for protecting sensitive data stored on a computing device in accordance with an embodiment comprises performing a number of steps during a boot-up process of the computing device. The steps include: (i) determining whether particular user input has been received via at least one user interface of the computing device; (ii) in response to a determination that the particular user input has been received, activating a first mode of operation of the computing device in which sensitive data stored on the computing device and non-sensitive data stored on the computing device are both visible and accessible to a user; and (iii) in response to a determination that the particular user input has not been received, activating a second mode of operation of the computing device in which the non-sensitive data stored on the computing device is visible and accessible to the user and the sensitive data stored on the computing device is rendered one or more of invisible to the user and inaccessible to the user.

In one embodiment of the foregoing method, determining whether the particular user input has been received via the at least one user interface of the computing device comprises determining whether one or more particular keys or buttons have been pressed.

In another embodiment of the foregoing method, determining whether the particular user input has been received via the at least one user interface of the computing device comprises determining whether a particular password has been entered.

In yet another embodiment, the foregoing method further includes, subsequent to rendering the sensitive data inaccessible to the user during the second operating mode, restoring access to the sensitive data in response to determining that the particular user input has been received via the at least one user interface of the computing device during a subsequent boot-up process.

In still another embodiment, the foregoing method further includes, subsequent to rendering the sensitive data inaccessible to the user during the second operating mode, restoring access to the sensitive data in response to determining that a second particular user input has been received via the at least one user interface of the computing device during a subsequent boot-up process.

In a further embodiment of the foregoing method, the second mode of operation of the computing device is a mode in which at least one item of sensitive data is rendered invisible to the user or inaccessible to the user by performing one or more of: hard deleting the item of sensitive data, soft deleting the item of sensitive data, causing file system requests for the item of sensitive data to be ignored, disabling the item of sensitive data from being opened, or closing or hiding a window in which the item of data is displayed.

A computer program product in accordance with an embodiment comprises a computer-readable memory having computer program logic recorded thereon that when executed by at least one processor causes the at least one processor to perform a method for protecting sensitive data stored on a computing device. The method comprises performing the following during a shut-down process of the computing device: (i) determining whether particular user input has been received via at least one user interface of the computing device; (ii) in response to a determination that the particular user input has been received, not activating a data protection mode of operation of the computing device in which sensitive data stored on the computing device is rendered one or more of invisible to a user and inaccessible to the user; and (iii) in response to a determination that the particular user input has not been received, activating the second mode of operation of the computing device.

In one embodiment of the foregoing computer program product, determining whether the particular user input has been received via the at least one user interface of the computing device comprises determining whether one or more particular keys or buttons have been pressed.

In another embodiment of the foregoing computer program product, determining whether the particular user input has been received via the at least one user interface of the computing device comprises determining whether a particular password has been entered.

In yet another embodiment of the foregoing computer program product, the method further comprises, subsequent to rendering the sensitive data inaccessible to the user during the second operating mode, restoring access to the sensitive data in response to determining that a particular password has been entered during a subsequently-executed login process of the computing device.

In still another embodiment of the foregoing computer program product, the method further comprises, subsequent to rendering the sensitive data inaccessible to the user during the second operating mode, restoring access to the sensitive data in response to determining that a particular password has been entered and at least one user input behavior is present during a subsequently-executed login process of the computing device.

In a further embodiment of the foregoing computer program product, the method further comprises, subsequent to rendering the sensitive data inaccessible to the user during the second operating mode, restoring access to the sensitive data in response to determining that the user has entered second particular input during a subsequently-executed boot-up process of the computing device.

In a still further embodiment of the foregoing computer program product, the second mode of operation of the computing device is a mode in which at least one item of sensitive data is rendered inaccessible by the user by performing one or more of: hard deleting the item of sensitive data, soft deleting the item of sensitive data, causing file system requests for the item of sensitive data to be ignored, or disabling the item of sensitive data from being opened.

VIII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computing device comprising:
   one or more processing circuits; and
   one or more memory devices that store program instructions for execution by the one or more processing circuits, the program instructions comprising:
   a monitor configured to determine whether a particular password has been entered and to determine whether at least one user input behavior is present; and
   a data protection enactor that is configured to activate a first mode of operation of the computing device in response to a determination that the particular password has been entered and the at least one user input behavior is present, and to activate a second mode of operation of the computing device in response to determining that the particular password has been entered and the at least one user input behavior is not present,
   the first mode of operation of the computing device comprising a mode in which sensitive data stored on the computing device and non-sensitive data stored on the computing device are both visible and accessible to a user,
   the second mode of operation of the computing device comprising a mode in which the non-sensitive data stored on the computing device is visible and accessible to the user and the sensitive data stored on the computing device is rendered one or more of invisible to the user and inaccessible to the user, the second mode of operation of the computing device comprising a mode in which at least one item of sensitive data is rendered invisible to the user or inaccessible to the user by performing one or more of:
   soft deleting the item of sensitive data, the soft deleting the item of sensitive data comprising deleting a link or file pointer to the item of sensitive data, the link or file pointer being restorable from a secure store; or
   closing or hiding a window in which the item of data is displayed.

2. The computing device of claim 1, wherein the data protection enactor is further configured to activate a third mode of operation of the computing device in response to a determination that the particular password has not been entered, the third mode of operation of the computing device comprising a mode in which access is denied to the sensitive data stored on the computing device and the non-sensitive data stored on the computing device.

3. The computing device of claim 1, wherein the monitor is configured to determine whether the at least one user input behavior is present by determining whether the particular password was entered by the user at a speed that is within a predefined range.

4. The computing device of claim 1, wherein the monitor is configured to determine whether the at least one user input behavior is present by determining whether or not a measure of regularity associated with the entry of the particular password by the user is within a predefined range.

5. The computing device of claim 1, wherein the monitor is configured to determine whether the at least one user input behavior is present by determining whether the user has provided particular input in addition to the particular password.

6. The computing device of claim 5, wherein the monitor is configured to determine whether the user has provided the particular input by:
   determining whether the user has pressed one or more particular keys or buttons before or after entering the particular password; or determining whether the user has entered one or more particular characters before or after entering the particular password.

7. The computing device of claim 1, wherein the second mode of operation of the computing device further comprises a mode in which at least one item of sensitive data is rendered invisible to the user or inaccessible to the user by performing one or more of:
   hard deleting the item of sensitive data;
   causing file system requests for the item of sensitive data to be ignored; or
   disabling the item of sensitive data from being opened.

8. A method for protecting sensitive data stored on a computing device, comprising:
   determining, during a boot-up process of the computing device, whether particular user input has been received via at least one user interface of the computing device;
   in response to a determination that the particular user input has been received, activating, during the boot-up process of the computing device, a first mode of operation of the computing device in which sensitive data stored on the computing device and non-sensitive data stored on the computing device are both visible and accessible to a user; and
   in response to a determination that the particular user input has not been received, activating, during the boot-up process of the computing device, a second mode of operation of the computing device in which the non-sensitive data stored on the computing device is visible and accessible to the user and the sensitive data stored on the computing device is rendered one or more of invisible to the user and inaccessible to the user by performing one or more of:
   soft deleting an item of sensitive data, the soft deleting the item of sensitive data comprising deleting a link or file pointer to the item of sensitive data, the link or file pointer being restorable from a secure store; or
   closing or hiding a window in which the item of data is displayed.

9. The method of claim 8, wherein determining whether the particular user input has been received via the at least one user interface of the computing device comprises determining whether one or more particular keys or buttons have been pressed.

10. The method of claim 8, wherein determining whether the particular user input has been received via the at least one user interface of the computing device comprises determining whether a particular password has been entered.

11. The method of claim 8, further comprising:
   subsequent to rendering the sensitive data inaccessible to the user during the second operating mode, restoring access to the sensitive data in response to determining that the particular user input has been received via the at least one user interface of the computing device during a subsequent boot-up process.

12. The method of claim 8, further comprising:
   subsequent to rendering the sensitive data inaccessible to the user during the second operating mode, restoring access to the sensitive data in response to determining that a second particular user input has been received via the at least one user interface of the computing device during a subsequent boot-up process.

13. The method of claim 8, wherein the second mode of operation of the computing device further comprises a mode in which at least one item of sensitive data is rendered invisible to the user or inaccessible to the user by performing one or more of:
   hard deleting the item of sensitive data;
   causing file system requests for the item of sensitive data to be ignored; or
   disabling the item of sensitive data from being opened.

14. A computer program product comprising a computer-readable memory having computer program logic recorded thereon that when executed by at least one processor causes the at least one processor to perform a method for protecting sensitive data stored on a computing device, the method comprising:
   determining whether a particular password has been entered;
   determining whether at least one user input behavior is present;
   in response to determining that the particular password has been entered and the at least one user input behavior is present, activating a first mode of operation of the computing device in which the sensitive data stored on the computing device and non-sensitive data stored on the computing device are both visible and accessible to a user; and
   in response to determining that the particular password has been entered and the at least one user input behavior is not present, activating a second mode of operation of the computing device in which the non-sensitive data stored on the computing device is visible and accessible to the user and the sensitive data stored on the computing device is rendered one or more of invisible to the user and inaccessible to the user by performing one or more of:
      soft deleting an item of sensitive data, the soft deleting the item of sensitive data comprising deleting a link or file pointer to the item of sensitive data, the link or file pointer being restorable from a secure store; or
      closing or hiding a window in which the item of data is displayed.

15. The computer program product of claim 14, wherein the method further comprises:
   activating a third mode of operation of the computing device in response to a determination that the particular password has not been entered, the third mode of operation of the computing device comprising a mode in which access is denied to the sensitive data stored on the computing device and the non-sensitive data stored on the computing device.

16. The computer program product of claim 14, wherein determining whether the at least one user input behavior is present comprises determining whether the particular password was entered by the user at a speed that is within a predefined range.

17. The computer program product of claim 14, wherein determining whether the at least one user input behavior is present comprises determining whether or not a measure of regularity associated with the entry of the particular password by the user is within a predefined range.

18. The computer program product of claim 14, wherein determining whether the at least one user input behavior is present comprises determining whether the user has provided particular input in addition to the particular password.

19. The computer program product of claim 18, wherein determining whether the user has provided the particular input comprises:
   determining whether the user has pressed one or more particular keys or buttons before or after entering the particular password; or determining whether the user has entered one or more particular characters before or after entering the particular password.

20. The computer program product of claim 14, wherein the second mode of operation of the computing device further comprises a mode in which at least one item of sensitive data is rendered invisible to the user or inaccessible to the user by performing one or more of:
   hard deleting the item of sensitive data;
   causing file system requests for the item of sensitive data to be ignored; or
   disabling the item of sensitive data from being opened.

* * * * *